(12) United States Patent
Liu et al.

(10) Patent No.: US 11,546,959 B2
(45) Date of Patent: Jan. 3, 2023

(54) LINK RECOVERY METHOD AND APPARATUS

(71) Applicant: HUAWEI TECHNOLOGIES CO., LTD., Guangdong (CN)

(72) Inventors: Kunpeng Liu, Beijing (CN); Di Zhang, Beijing (CN); Xu Zhang, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 17/094,200

(22) Filed: Nov. 10, 2020

(65) Prior Publication Data

US 2021/0068191 A1 Mar. 4, 2021

Related U.S. Application Data

(63) Continuation of application No. PCT/CN2019/086417, filed on May 10, 2019.

(30) Foreign Application Priority Data

May 11, 2018 (CN) .......................... 201810451036.X

(51) Int. Cl.
*H04W 76/19* (2018.01)
*H04W 76/11* (2018.01)
(Continued)

(52) U.S. Cl.
CPC ............ *H04W 76/19* (2018.02); *H04L 1/0061* (2013.01); *H04L 5/005* (2013.01); *H04W 56/001* (2013.01);
(Continued)

(58) Field of Classification Search
None
See application file for complete search history.

(56) References Cited

U.S. PATENT DOCUMENTS 9,734,513 B1* 8/2017 Mehr ................. G06Q 30/0621
2003/0123470 A1* 7/2003 Kim ..................... H04L 1/1887
370/437
(Continued)

FOREIGN PATENT DOCUMENTS

CN 103858465 A 6/2014
CN 107612602 A 1/2018
(Continued)

OTHER PUBLICATIONS

ZTE, "Remaining details on beam recover", 3GPP TSG RAN WG1 Meeting AH 1801, Vancouver, Canad, Jan. 22-26, 2018 (Year: 2018).*
(Continued)

*Primary Examiner* — Andrew C Oh
(74) *Attorney, Agent, or Firm* — Fish & Richardson P.C.

(57) ABSTRACT

Example link recovery methods and apparatus are described. One example method includes determining a link failure of a first control resource set, where the first control resource set is a control resource set configured by a first master information block MIB. A link failure recovery request is sent, where the link failure recovery request is used to request to recover a communication link of the first control resource set. The first control resource set may be a control resource set (CORESET), a control region, or an enhanced physical downlink control channel (ePDCCH) set defined in a 5G mobile communications system.

16 Claims, 14 Drawing Sheets

(51) Int. Cl.
  *H04L 1/00*    (2006.01)
  *H04L 5/00*    (2006.01)
  *H04W 56/00*   (2009.01)
  *H04W 72/00*   (2009.01)
  *H04W 72/04*   (2009.01)

(52) U.S. Cl.
  CPC ....... *H04W 72/005* (2013.01); *H04W 72/042* (2013.01); *H04W 72/0446* (2013.01); *H04W 72/0453* (2013.01); *H04W 76/11* (2018.02)

(56) References Cited

U.S. PATENT DOCUMENTS

| | | | | |
|---|---|---|---|---|
| 2003/0162511 | A1* | 8/2003 | Kim | H04B 7/061 455/562.1 |
| 2003/0224826 | A1* | 12/2003 | Sakata | H04W 88/12 455/442 |
| 2009/0109838 | A1* | 4/2009 | Kuo | H04W 76/18 370/216 |
| 2010/0015974 | A1* | 1/2010 | Stubbings | H04W 76/45 455/434 |
| 2010/0182903 | A1* | 7/2010 | Palanki | H04J 11/005 370/252 |
| 2010/0246434 | A1* | 9/2010 | Wang | H04W 48/16 370/255 |
| 2010/0330982 | A1* | 12/2010 | Ishii | H04W 76/18 455/422.1 |
| 2013/0156005 | A1* | 6/2013 | Li | H04L 5/0064 370/329 |
| 2014/0119335 | A1* | 5/2014 | Wang | H04L 5/0092 370/329 |
| 2014/0287759 | A1* | 9/2014 | Purohit | H04W 36/00835 455/437 |
| 2015/0312071 | A1* | 10/2015 | Chen | H04L 1/0003 370/329 |
| 2016/0044638 | A1* | 2/2016 | Gao | H04W 72/0453 370/280 |
| 2016/0094627 | A1* | 3/2016 | Subramanyam | G06F 9/54 709/203 |
| 2016/0254878 | A1* | 9/2016 | Wang | H04W 72/042 370/329 |
| 2017/0171903 | A1* | 6/2017 | Kubota | H04W 36/165 |
| 2017/0208488 | A1* | 7/2017 | Hwang | H04W 76/30 |
| 2017/0339612 | A1* | 11/2017 | Quan | H04W 68/02 |
| 2018/0083680 | A1 | 3/2018 | Guo et al. | |
| 2018/0199187 | A1* | 7/2018 | Byun | H04W 8/22 |
| 2018/0220353 | A1* | 8/2018 | Mendiola | H04W 24/02 |
| 2018/0227936 | A1* | 8/2018 | Yerramalli | H04L 1/0067 |
| 2018/0234894 | A1* | 8/2018 | Jiang | H04W 76/27 |
| 2018/0279135 | A1* | 9/2018 | Hwang | H04W 16/28 |
| 2018/0302889 | A1* | 10/2018 | Guo | H04B 7/088 |
| 2018/0309560 | A1* | 10/2018 | Tang | H04L 5/0005 |
| 2018/0338274 | A1* | 11/2018 | Gallagher | H04W 48/02 |
| 2019/0045488 | A1* | 2/2019 | Park | H04L 5/0048 |
| 2019/0174421 | A1* | 6/2019 | Quan | H04W 36/00 |
| 2019/0394751 | A1* | 12/2019 | Park | H04W 72/0446 |
| 2019/0394786 | A1* | 12/2019 | Parron | H04L 27/0006 |
| 2020/0067685 | A1* | 2/2020 | Awad | H04W 72/0453 |
| 2020/0127786 | A1* | 4/2020 | Kwak | H04L 27/261 |
| 2020/0252180 | A1* | 8/2020 | Takeda | H04W 72/042 |
| 2020/0359407 | A1* | 11/2020 | Takeda | H04L 5/0094 |
| 2020/0374909 | A1* | 11/2020 | Takeda | H04W 72/1257 |
| 2020/0404617 | A1* | 12/2020 | Murray | H04B 7/0695 |
| 2021/0058130 | A1* | 2/2021 | Zhu | H04W 74/0833 |
| 2021/0058998 | A1* | 2/2021 | Yuan | H04W 24/08 |
| 2021/0076386 | A1* | 3/2021 | Liu | H04W 56/001 |

FOREIGN PATENT DOCUMENTS

| | | |
|---|---|---|
| CN | 109391405 A | 2/2019 |
| JP | 2011519509 A | 7/2011 |
| WO | 2017024516 A1 | 2/2017 |

OTHER PUBLICATIONS

InterDigital, "Remaining details no beam failure recover", 3GPP TSG RAN WG1 Meeting AH 1801, Vancouver, Canada, Jan. 22-26, 2018 (Year: 2018).*
3GPP TS 38.321 v15.1.0 (Mar. 2018). Medium Access Control protocl specification (Release 15).*
Huawei, HiSilicon, "Design of control resource set," 3GPP TSG RAN WG1 NR Ad Hoc Meeting, R1-1700014, Spokane, USA, Jan. 16-20, 2017, 5 pages.
LG Electronics, "SS block based RRM measurement," 3GPP TSG RAN WG1 Meeting NR#2, R1-1710272, Qingdao, P.R. China, Jun. 27-30, 2017, 5 pages.
Office Action issued in Chinese Application No. 201810451036.X dated Jan. 5, 2022, 17 pages (with English translation).
Qualcomm Incorporated, "Control resource set and search space," 3GPP TSG RAN WG1 NR Adhoc #3, R1-1716414, Nagoya, Japan, Sep. 18-21, 2017, 8 pages.
Qualcomm Incorporated, "Radio link monitoring consideration," 3GPP TSG-RAN WG1 RAN1 #90, R1-1713385, Prague, CZ, Aug. 21-25, 2017, 7 pages.
ZTE, "Discussion on mechanism to recovery from beam failure," 3GPP TSG RAN WG1 Meeting #90, R1-1712300, Prague, Czechia, Aug. 21-25, 2017, 9 pages.
ZTE," NR-PDCCH Coreset Configuration," 3GPP TSG RAN WG1 Meeting #90, R1-1712441, Prague, Czechia, Aug. 21-25, 2017, 6 pages.
Extended European Search Report issued in European Application No. 19800444.2 dated Feb. 1, 2022, 11 pages.
InterDigital, Inc., "Remaining details on beam failure recovery", 3GPP TSG RAN WG1 Meeting AH 1801, R1-1800629, Vancouver, Canada, Jan. 22-26, 2018, 3 pages.
Mediatek, "Summary on Beam Recovery Mechanism," 3GPP TSG RAN WG1 Meeting NR AH#3, R1-1716767, Nagoya, Japan, Sep. 18-21, 2017, 23 pages.
Office Action issued in Japanese Application No. 2020-563661 dated Jan. 11, 2022, 12 pages (with English translation).
Oppo, "Remaining Issues and Text Proposals for Beam Management," 3GPP TSG RAN WG1 #93, R1-1806840, Busan, Korea, May 21-25, 2018, 11 pages.
Vivo, "Remaining issues on mechanism to recover from beam failure," 3GPP TSG RAN WG1 #92b, R1-1803818, Sanya, China, Apr. 16-20, 2018, 6 pages.
ZTE et al., "Remaining details on beam recovery," 3GPP TSG RAN WG1 Meeting AH 1801, R1-1800111, Vancouver, Canada, Jan. 22-26, 2018, 7 pages.
3GPP TS 38.213 V15.1 0 (Mar. 2018), "3rd Generation Partnership Project; Technical Specification Group Radio Access Network; NR; Physical layer procedures for control (Release 15)," Mar. 2018, 77 pages.
3GPP TS 38.321 V15.1 0 (Mar. 2018), "3rd Generation Partnership Project;Technical Specification Group Radio Access Network; NR; Medium Access Control (MAC) protocol specification(Release 15)," Mar. 2018, 67 pages.
3GPP TS 38.331 V15.1 0 (Mar. 2018), 3rd Generation Partnership Project; Technical Specification Group Radio Access Network; NR; Radio Resource Control (RRC) protocol specification Release 15), Mar. 2018, 268 pages.
Asustek, "Remaining Issues for Beam Failure Recovery Procedure," 3GPP TSG RAN WG1 Meeting #92, R1-1802071, Athens, Greece, Feb. 26-Mar. 2, 2018, 4 pages.
AT&T, "On beam recovery for partial and full control channel failure," 3GPP TSG RAN WG1 Meeting NR#3, R1-1716169, Nagoya, Japan, Sep. 18-21, 2017, 7 pages.
PCT International Search Report and Written Opinion issued in International Application No. PCT/CN2019/086417 dated Aug. 8, 2019, 17 pages (with English translation).
Spreadtrum Communications, Remaining issues on beam failure recovery mechanism 3GPP TSG RAN WG1 Meeting 91, R1-1719695, Reno, USA, Nov. 27-Dec. 1, 2017, 4 pages.

(56) References Cited

OTHER PUBLICATIONS

Huawei et al., "Summary of remaining issues on beam failure recovery," 3GPP TSG RAN WG1 Meeting #92bis, R1-1803637, Sanya, China, Apr. 16-20, 2018, 16 pages.
Huawei et al., "Link recovery procedure for beam failure," 3GPP TSG RAN WG1 Meeting #88b, R1-1704230, Spokane, USA, Apr. 3-7, 2017, 8 pages.
Huawei et al., "Remaining details on beam failure recovery," 3GPP TSG RAN WG1 Meeting 91, R1-1719423, Reno, USA, Nov. 27-Dec. 1, 2017, 8 pages.
Office Action issued in Chinese Application No. 201810451036.X dated Jun. 28, 2021, 13 pages.
Office Action issued in Japanese Application No. 2020-563661 dated Jun. 14, 2022, 10 pages (with English translation).
Ericsson, "Remaining Details of Beam Management," 3GPP TSG RAN WG1 Meeting #92bis, R1-1804974, Sanya, China, Apr. 16-20, 2018, 12 pages.
Office Action issued in Korean Application No. 2020-7035743 dated Oct. 19, 2022, 9 pages (with English translation).

\* cited by examiner

LINK RECOVERY METHOD AND APPARATUS

CROSS-REFERENCE TO RELATED APPLICATIONS

This application is a continuation of International Application No. PCT/CN2019/086417, filed on May 10, 2019, which claims priority to Chinese Patent Application No. 201810451036.X, filed on May 11, 2018. The disclosures of the aforementioned applications are hereby incorporated by reference in their entireties.

TECHNICAL FIELD

This application relates to the communications field, and in particular, to a link recovery method and apparatus.

BACKGROUND

With emergence of intelligent terminals, especially emergence of video services on the terminals, current spectrum resources can hardly match an explosive growth of users' capacity requirements. A high frequency band (for example, a millimeter-wave band) with a larger available bandwidth gradually becomes a candidate frequency band of a next-generation communications system. However, the high frequency band causes a larger path loss than a low frequency band.

A signal transmission mechanism based on a beamforming technology is used to overcome the path loss of the high frequency band. The beamforming technology compensates for the path loss by generating a relatively large antenna gain in a specific direction. When a signal is transmitted based on the beamforming technology because the signal has a relatively large antenna gain only in a specific direction, once a receive end moves (that is, a beam is not aligned) or a relatively large obstacle appears on a transmission path of the signal (that is, a beam is blocked), an antenna gain of the signal is greatly reduced, and signal interruption frequently occurs at the receive end.

The beam needs to be adjusted in time when the beam is not aligned or the beam is blocked, to quickly recover a communication link, so as to reduce a communication latency. In all communication links to be recovered, a communication link of a control resource set configured by a master information block (MIB) is particularly important. Therefore, how to recover the communication link of the control resource set configured by the MIB is a problem to be resolved.

SUMMARY

This application provides a link recovery method and apparatus, to recover a communication link of a control resource set configured by an MIB.

According to a first aspect, a link recovery method is provided. The method includes: determining a link failure of a first control resource set, where the first control resource set is a control resource set configured by a first MIB; and sending a link failure recovery request, where the link failure recovery request is used to request to recover a communication link of the first control resource set.

The first control resource set may be a control resource set (CORESET), a control region, or an enhanced physical downlink control channel (ePDCCH) set defined in a 5th-generation (5G) mobile communications system, or may be a resource set that is defined in another mobile communications system (for example, a sixth-generation mobile communications system) and that carries a physical downlink control channel (PDCCH). When a terminal device detects that the link failure occurs on the communication link of the first control resource set, the terminal device may send, to a network device, a request message used to request to recover the communication link of the first control resource set, that is, send the link failure recovery request, so that the communication link of the control resource set configured by the MIB can be quickly recovered.

Optionally, determining the link failure of the first control resource set includes: determining a search space set associated with the first control resource set (optional step); determining a link failure detection mode of the communication link of the first control resource set based on the search space set associated with the first control resource set; and determining the link failure on the communication link of the first control resource set based on the link failure detection mode.

The search space set associated with the first control resource set may have different types. For example, a search space associated with the first control resource set may be a broadcast search space or a non-broadcast search space. When the search space associated with the first control resource set is the broadcast search space, because a beam associated with a CORESET 0 (namely, the CORESET configured by the first MIB) associated with the broadcast search space is a cell specific beam (where in this application, terms "beam" and "reference signal" are equivalent and may be used interchangeably), the base station repeatedly sends same broadcast information on the CORESET 0 corresponding to a plurality of synchronization signal/physical broadcast channel blocks (SSB). If the link failure occurs, the terminal device may automatically switch between the SSBs, and the base station does not need to reconfigure quasi co-location (QCL) information of the CORESET 0. When the search space associated with the first control resource set is the non-broadcast search space (for example, a UE specific search space), because content sent in the non-broadcast search space is user equipment specific (UE specific) content or user equipment group common (UE group common) content, the base station does not send same non-broadcast information on the CORESET 0 corresponding to each SSB. In this case, the base station notifies the user equipment of an SSB used for the non-broadcast search space, so that the user equipment detects whether the link failure occurs on the CORESET 0 associated with the non-broadcast search space. If the link failure occurs, the user equipment needs to notify the base station to reconfigure a beam or the CORESET corresponding to the non-broadcast search space. In the foregoing method, whether the link failure occurs on the communication link of the first control resource set is detected based on a type of the search space associated with the first control resource set. This can improve link recovery efficiency.

Optionally, a CRC of downlink control information (DCI) detected in the non-broadcast search space in a non-broadcast search space set is scrambled by at least one of the following information:

random access RNTI (RA-RNTI), temporary cell RNTI (TC-RNTI), cell RNTI (C-RNTI), interruption RNTI (INT-RNTI), slot format indication RNTI (SFI-RNTI), transmit power control physical uplink shared channel RNTI (TPC-PUSCH-RNTI), transmit power control physical uplink control channel RNTI (TPC-PUCCH-RNTI), transmit power control sounding reference symbols RNTI (TPC-SRS- RNTI), configured scheduling RNTI (CS-RNTI), or semi-persistent channel state information RNTI (SP-CSI-RNTI).

It should be noted that a range of the foregoing definition of the non-broadcast search space may be different in other parts below. To be specific, in some implementations below, the range of the definition of the non-broadcast search space may be narrowed down.

Optionally, a reference signal resource set used for link failure detection of the first control resource set includes a first reference signal and a second reference signal, the first reference signal is used for link failure detection of a control resource set other than the first control resource set, and the second reference signal is used to indicate a reception parameter associated with the first control resource set; and determining the link failure of the first control resource set includes:

determining the link failure of the first control resource set when signal quality of the first reference signal and signal quality of the second reference signal are both less than a first threshold; or determining the link failure of the first control resource set when signal quality of the second reference signal is less than a first threshold.

In this method, the terminal device can determine whether the link of the first control resource set fails without needing to determine the type of the search space associated with the first control resource set. This reduces complexity of recovering the communication link of the first control resource set by the terminal device.

Optionally, a reference signal resource set used for link failure detection of the first control resource set includes only a second reference signal, and the second reference signal is used to indicate a reception parameter associated with the first control resource set; and determining the link failure of the first control resource set includes:

determining the link failure of the first control resource set when signal quality of the second reference signal is less than a first threshold.

In this method, the terminal device can determine whether the link of the first control resource set fails without needing to determine the type of the search space associated with the first control resource set. This reduces complexity of recovering the communication link of the first control resource set by the terminal device.

Optionally, when the search space is the non-broadcast search space, a reference signal resource set used for link failure detection of the first control resource set includes a first reference signal and a second reference signal, the first reference signal is used for link failure detection of a control resource set configured by non-MIB information (or the first reference signal is used for link failure detection of a control resource set other than the first control resource set), and the second reference signal is used to indicate a reception parameter associated with the first control resource set (or the second reference signal and a DMRS of the first control resource set satisfy a QCL relationship).

Optionally, the non-broadcast search space set includes a type 3 common search space. A CRC of DCI detected in the type 3 common search space (Type3-PDCCH common search space) is scrambled by at least one of the following information: INT-RNTI, SFI-RNTI, TPC-PUSCH-RNTI, TPC-PUCCH-RNTI, TPC-SRS-RNTI, C-RNTI, CS-RNTI, and SP-CSI-RNTI (a Type3-PDCCH common search space for a DCI format with CRC scrambled by INT-RNTI, or SFI-RNTI, or TPC-PUSCH-RNTI, or TPC-PUCCH-RNTI, or TPC-SRS-RNTI, or C-RNTI, or CS-RNTI, or SP-CSI-RNTI).

Optionally, a CRC of DCI detected in the non-broadcast search space set is scrambled by at least one of the following information: INT-RNTI, SFI-RNTI, TPC-PUSCH-RNTI, TPC-PUCCH-RNTI, TPC-SRS-RNTI, C-RNTI, CS-RNTI, and SP-CSI-RNTI.

Optionally, a DCI format of the non-broadcast search space set includes at least one of the following formats: a DCI format 2_0, a DCI format 2_1, a DCI format 2_2, and a DCI format 2_3, where the terminal device detects the DCI format 2_0 with a CRC scrambled by SFI-RNTI (UE detects the DCI format 2_0 with CRC scrambled by SFI-RNTI);

the terminal device detects the DCI format 2_1 with a CRC scrambled by INT-RNTI (UE detects the DCI format 2_1 with CRC scrambled by INT-RNTI);

the terminal device detects the DCI format 2_2 with a CRC scrambled by TPC-PUSCH-RNTI or TPC-PUCCH-RNTI (UE detects the DCI format 2_2 with CRC scrambled by TPC-PUSCH-RNTI or TPC-PUCCH-RNTI); and the terminal device detects the DCI format 2_3 with a CRC scrambled by TPC-SRS-RNTI (UE detects the DCI format 2_3 with CRC scrambled by TPC-SRS-RNTI).

Optionally, there is a correspondence between the first reference signal and the control resource set configured by the non-MIB information (for example, RRC signaling) and/or between the first reference signal and QCL assumption information of the control resource set. A first reference signal with a larger identifier value or index value corresponds to a control resource set, configured by the non-MIB information, with a larger identifier value or index value; and/or the first reference signal with a larger identifier value or index value corresponds to QCL assumption information of the control resource set, configured by the non-MIB information, with a larger identifier value or index value; and/or a first reference signal with a smaller identifier value or index value corresponds to a control resource set, configured by the non-MIB information, with a smaller identifier value or index value; and/or the first reference signal with a smaller identifier value or index value corresponds to QCL assumption information of a control resource set, configured by the non-MIB information, with a smaller identifier value or index value. A meaning of the foregoing "corresponding to" is as follows: When a reference signal 1 corresponds to a control resource set 1, the reference signal 1 is used for link failure detection of the control resource set 1; or when a reference signal 1 corresponds to QCL assumption information of a control resource set 1, the terminal device may receive the reference signal 1 by using the QCL assumption information of the control resource set 1. The foregoing correspondence is not limited to a one-to-one correspondence. For example, at least two first reference signals may correspond to one control resource set configured by the non-MIB information, or one first reference signal may correspond to at least two control resource sets configured by the non-MIB information.

Optionally, there is a correspondence between the first reference signal and the control resource set configured by the non-MIB information and/or between the first reference signal and a QCL of the control resource set. First reference signals sorted in ascending order by identifier values or index values correspond to control resource sets, configured by the non-MIB information, sorted in ascending order by identifier values or index values; and/or the first reference signals sorted in ascending order by identifier values or index values correspond to TCIs of the control resource sets configured by the non-MIB information (to be specific, the first reference signals sorted in ascending order by identifier values or the index values correspond to the control resource sets, configured by the non-MIB information, sorted in ascending order by identifier values or index values). For a meaning of "corresponding to", refer to the description in the foregoing "optional" implementation.

Optionally, first reference signals are in a one-to-one correspondence with control resource sets configured by the non-MIB information and/or QCL assumption information of the control resource sets (that is, a quantity of the first reference signals is equal to a quantity of the control resource sets configured by the non-MIB information, and/or the quantity of the first reference signals is equal to a quantity of TCIs of the control resource sets configured by the non-MIB information). A first reference signal with a larger identifier value or index value corresponds to a control resource set, configured by the non-MIB information, with a larger identifier value or index value; and/or the first reference signal with a larger identifier value or index value corresponds to QCL assumption information of the control resource set, configured by the non-MIB information, with a larger identifier value or index value; and/or a first reference signal with a smaller identifier value or index value corresponds to a control resource set, configured by the non-MIB information, with a smaller identifier value or index value; and/or the first reference signal with a smaller identifier value or index value corresponds to QCL assumption information of the control resource set, configured by the non-MIB information, with a smaller identifier value or index value. For a meaning of the foregoing "corresponding to", refer to the foregoing "optional" implementation.

Optionally, first reference signals are in a one-to-one correspondence with control resource sets configured by the non-MIB information and/or QCL assumption information of the control resource sets. A quantity of the first reference signals is equal to a quantity of the control resource sets configured by the non-MIB information; and/or the quantity of the first reference signals is equal to a quantity of TCIs of the control resource sets configured by the non-MIB information; and the first reference signals sorted in ascending order by identifier values or index values are in a one-to-one correspondence with the control resource sets, configured by the non-MIB information, sorted in ascending order by identifier values or index values; and/or the first reference signals sorted in ascending order by identifier values or index values are in a one-to-one correspondence with the TCIs of the control resource sets configured by the non-MIB information (to be specific, the first reference signals sorted in ascending order by identifier values or index values are in a one-to-one correspondence with the control resource sets, configured by the non-MIB information, sorted in ascending order by identifier values or index values). For a meaning of "corresponding to", refer to the description in the foregoing "optional" implementation.

The "identifier" is absolute indication information of the reference signal or the control resource set, and the "index" is relative indication information of the reference signal or the control resource set.

According to the foregoing method, each control resource set configured by the non-MIB information has a corresponding link failure detection signal, so that it can be ensured that a status of a link of each control resource set can be detected by the terminal device and the link can be recovered in time. This ensures system stability. In addition, one control resource set or one TCI corresponds to one link failure detection signal. This can effectively reduce reference signal resource overheads and simplify complexity of link detection because if one control resource set or one TCI corresponds to a plurality of reference signals, resource overheads are increased, and complexity of comparing channel quality of the plurality of reference signals with the first threshold increases. For example, an average value of the channel quality of the plurality of RSs may need to be obtained and then compared with the first threshold.

For example, the first reference signals are two reference signals whose reference signal identifiers or indexes (RS ID/index) are 1 and 3, namely, an RS 1 and an RS 3, and the control resource sets configured by the non-MIB information are two control resource sets whose identifiers or indexes are 3 and 6, namely, a CORESET 3 and a CORESET 6. The RS 1 corresponds to the CORESET 3, and the RS 3 corresponds to the CORESET 6. In other words, the RS 1 is used for link failure detection of the CORESET 3, and the RS 3 is used for link failure detection of the CORESET 6.

Optionally, QCL information of the first reference signal is the same as QCL information of a control resource set corresponding to the reference signal.

Optionally, determining the link failure of the first control resource set based on the link failure detection mode (or determining the link failure of the first control resource set) includes:

determining the link failure of the first control resource set when signal quality of the first reference signal is less than or equal to a first threshold and when signal quality of the second reference signal is less than or equal to the first threshold; or determining the link failure of the first control resource set when signal quality of the second reference signal is less than or equal to a first threshold.

There may be one or more first reference signals, and there may also be one or more second reference signals. The first reference signal is a reference signal that is pre-configured by the network device and that is used to detect whether the link failure occurs on the communication link of the first control resource set. The second reference signal is, for example, a synchronization signal/physical broadcast channel block (SSB). The terminal device may detect whether the signal quality (for example, a signal to noise ratio) of the first reference signal and the signal quality of the second reference signal are less than or equal to the first threshold. When both the signal quality of the first reference signal and the signal quality of the second reference signal are less than or equal to the first threshold, the terminal device determines that the link failure occurs on the communication link of the first control resource set. That "both the signal quality of the first reference signal and the signal quality of the second reference signal are less than or equal to the first threshold" includes: Signal quality of at least one or all of the first reference signals is less than or equal to the first threshold, and signal quality of at least one or all of the second reference signals is less than or equal to the first threshold. According to the method, a specific reference signal does not need to be selected for detection. The method is easy to implement and has better compatibility. The compatibility means that a link failure recovery procedure of another CORESET (a CORESET other than the CORESET 0) may be directly reused in the method, including reusing procedures of sending a link failure recovery request and receiving a link failure recovery request response for the another CORESET.

Alternatively, the terminal device may detect only whether the signal quality (for example, a signal to noise ratio) of the second reference signal is less than or equal to the first threshold. When the signal quality of the second reference signal is less than or equal to the first threshold, the terminal device determines that the link failure occurs on the communication link of the first control resource set. That "the signal quality of the second reference signal is less than or equal to the first threshold" includes: Signal quality of at least one or all of the second reference signals is less than or equal to the first threshold. The first reference signal does not need to be used in combination to determine whether the link failure occurs, and whether to initiate the link failure recovery request. Therefore, complexity of determining the link failure on the communication link of the first control resource set by the terminal device is reduced.

Optionally, determining the link failure of the first control resource set based on the link failure detection mode (or determining the link failure of the first control resource set) includes:

determining the link failure of the first control resource set when signal quality of the first reference signal is less than or equal to a first threshold in a reporting periodicity and when signal quality of the second reference signal is less than or equal to the first threshold in the reporting periodicity; or determining the link failure of the first control resource set when signal quality of the second reference signal is less than or equal to a first threshold in a reporting periodicity.

The reporting periodicity is a periodicity for reporting a link failure instance by a physical (PHY) layer to a media access control (MAC) layer.

Link failure instances of the first control resource set need to be counted for a plurality of times to improve reliability of determining the link failure of the first control resource set. A function of counting the link failure instances of the first control resource set for a plurality of times is implemented at the MAC layer. Therefore, according to the method, the reliability of determining the link failure of the first control resource set can be improved.

Optionally, when the search space set includes the non-broadcast search space (where the search space set is not limited to including only the non-broadcast search space, and may further include a broadcast search space), a reference signal resource set used for link failure detection of the first control resource set includes only a second reference signal, and the second reference signal is used to indicate a reception parameter associated with the first control resource set.

Optionally, determining the link failure of the first control resource set based on the link failure detection mode (or determining the link failure of the first control resource set) includes:

determining the link failure of the first control resource set when signal quality of the second reference signal is less than or equal to a first threshold.

The network device may configure only the second reference signal in the reference signal resource set for link failure detection of the first control resource set. There may be one or more second reference signals. The terminal device detects the second reference signal (for example, an SSB). When the signal quality of the second reference signal is less than or equal to the first threshold, the terminal device determines the link failure of the first control resource set. Alternatively, when the signal quality of the second reference signal is less than or equal to the first threshold for several consecutive times, the terminal device determines the link failure of the first control resource set. That "the signal quality of the second reference signal is less than or equal to the first threshold" may be that signal quality of at least one second reference signal is less than or equal to the first threshold, or signal quality of each second reference signal is less than or equal to the first threshold. A function of determining whether the signal quality of the second reference signal is less than or equal to the first threshold for several consecutive times may be implemented at a physical layer of the terminal device. The first control resource set (for example, the CORESET 0) is used to receive a system message that usually carries important information. In the method, the communication link of the first control resource set can be quickly recovered while compatibility is maintained.

Optionally, determining the link failure of the first control resource set based on the link failure detection mode (or determining the link failure of the first control resource set) includes:

determining the link failure of the first control resource set when signal quality of the second reference signal is less than or equal to a first threshold in a reporting periodicity, where the reporting periodicity is a periodicity for reporting a link failure instance by a physical (PHY) layer to a MAC layer.

Link failure instances of the first control resource set need to be counted for a plurality of times to improve reliability of determining the link failure of the first control resource set. A function of counting the link failure instances of the first control resource set for a plurality of times is implemented at the MAC layer. Therefore, according to the method, the reliability of determining the link failure of the first control resource set can be improved.

Optionally, if the reporting periodicity of the first control resource set is the same as a link failure detection periodicity of another control resource set (namely, the control resource set configured by the non-MIB information), the MAC layer of the terminal device performs counting for the first control resource set and the another control resource set separately. In this case, indication information (namely, a link failure instance) sent by the physical layer needs to indicate a control resource set or a control resource set type (for example, a control resource set configured by the MIB or the non-MIB information) corresponding to the link failure instance.

Optionally, if the reporting periodicity of the first control resource set is different from a link failure detection periodicity of another control resource set (namely, the control resource set configured by the non-MIB information), the MAC layer of the terminal device performs counting for the first control resource set and the another control resource set separately, and the reporting periodicity of the first control resource set is determined based on only the second reference signal (for example, an SSB).

Optionally, sending the link failure recovery request includes: determining a third reference signal based on a third reference signal resource set, where the third reference signal is a reference signal, in the third reference signal resource set, whose signal quality is greater than or equal to a second threshold, and the reference signal in the third reference signal resource set is a synchronization signal and/or a broadcast channel reference signal; and sending the link failure recovery request, where the link failure recovery request is used to request to recover the communication link of the first control resource set based on the third reference signal.

The third reference signal resource set is, for example, an SSB set configured by an RMSI, and an SSB in the SSB set is, for example, a PSS, a PBCH, or a DMRS in one synchronization broadcast channel block. The second threshold may be configured by the network device, or may be predefined. A value of the second threshold may be the same as or different from a value of the first threshold. The terminal device may detect the SSBs in the SSB set, to determine an SSB (namely, the third reference signal) whose signal quality is greater than or equal to the second threshold, so as to further request the network device to recover the communication link of the first control resource set based on the second reference signal. In the foregoing method, the second reference signal is directly determined, and there is no other intermediate process. This improves link recovery efficiency of the first control resource set.

Optionally, sending the link failure recovery request includes: determining a third reference signal based on a fourth reference signal associated with a second control resource set, where the second control resource set is one of a plurality of control resource sets configured before determining the link failure of the first control resource set, quality of a reference signal (namely, a reference signal used for link failure detection) corresponding to the second control resource set is greater than or equal to the first threshold and/or a second threshold, the fourth reference signal and the third reference signal satisfy a QCL assumption relationship, and the fourth reference signal is used to indicate a reception parameter associated with the second control resource set; and sending the link failure recovery request, where the link failure recovery request is used to request to recover the communication link of the first control resource set based on the third reference signal.

The fourth reference signal is, for example, a channel state information reference signal (CSI-RS), or may be another reference signal (for example, a tracking reference signal (TRS)). The terminal device may determine the third reference signal based on the CSI-RS and the QCL assumption relationship. There is a QCL assumption relationship between the third reference signal and the CSI-RS. The first threshold is, for example, a hypothetical BLER of a PDCCH, and the second threshold is, for example, RSRP. The examples of the first threshold and the second threshold are also applicable to the first threshold and the second threshold in other parts of this application. In the method, signal quality of a configured SSB does not need to be measured again, and the third reference signal is directly determined based on a transmission configuration indicator (TCI) corresponding to a CORESET on which no link failure occurs. This improves link recovery efficiency of the first control resource set, and improves efficiency of identifying a new link. When configuring the CORESET, the network device configures a TCI state identifier (TCI state ID), where the TCI state identifier corresponds to one TCI state, the TCI state includes different types of QCL information, and the QCL information includes a resource index of a reference signal. In this way, the terminal device can determine the third reference signal based on the TCI.

Optionally, sending the link failure recovery request includes: sending the link failure recovery request, where the link failure recovery request is used to request to recover (or reconfigure) the communication link of the first control resource set based on a third reference signal, the third reference signal is used to indicate a reception parameter associated with a second control resource set, the second control resource set is one of a plurality of control resource sets configured before determining the link failure of a first control resource set, and quality of a reference signal (namely, a reference signal used for link failure detection) corresponding to the second control resource set is greater than or equal to the first threshold and/or a second threshold.

For example, the third reference signal is used to indicate an SSB associated with the second control resource set. The terminal device may request the network device to recover the communication link of the first control resource set based on the SSB. In other words, a reception parameter used by the terminal device to receive the SSB may be used to detect downlink control information carried in the first control resource set. Compared with the method of determining the third reference signal based on the CSI-RS of the second control resource set, the method of determining the third reference signal based on the SSB of the second control resource set reduces complexity of determining the third reference signal.

Optionally, the terminal device may determine the third reference signal in the following manner:

when the reference signal associated with the second control resource set is an SSB, determining the SSB as the third reference signal;

when the reference signal associated with the second control resource set is a CSI-RS, and there is a QCL relationship between the CSI-RS and an SSB, determining the SSB as the third reference signal; or when the reference signal associated with the second control resource set is neither an SSB nor a CSI-RS, or when the reference signal associated with the second control resource set is a CSI-RS and there is no QCL relationship between the CSI-RS and an SSB, determining, from the third reference signal resource set, an SSB with relatively good channel quality as the third reference signal.

According to the foregoing method, it is ensured that the communication link of the first control resource set is recovered (or reconfigured) based on the third reference signal, and load of determining the third reference signal by the terminal device is reduced to a maximum extent.

Optionally, the method further includes: receiving a link failure recovery request response on a third control resource set; and/or detecting, on the third control resource set, the search space associated with the first control resource set, where the third control resource set is a control resource set (including at least one of a broadcast search space and a non-broadcast search space) associated with the third reference signal, and the third control resource set is a control resource set configured by a second MIB.

The second MIB may be the same as or different from the first MIB. The network device may directly send the link failure recovery request response by using the third control resource set, or may not send the link failure recovery request response, but sends DCI by using the third control resource set. When the terminal device detects, on the third control resource set, the search space associated with the first control resource set, and obtains the DCI, the terminal device may determine that the link failure recovery request response is received (where the DCI is equivalent to the link failure recovery request response). Alternatively, the network device may send the DCI by using the third control resource set after sending the link failure recovery request response. In the foregoing method, the link recovery request including the third reference signal implicitly indicates a parameter (namely, the reception parameter indicated by the third reference signal) used by the terminal device to detect the non-broadcast search space, and the network device does not need to reconfigure the non-broadcast search space of the first control resource set. This reduces signaling overheads and improves link recovery efficiency of the first control resource set.

Optionally, the method further includes: receiving a link failure recovery request response on the second control resource set; and/or detecting, on the second control resource set, the non-broadcast search space set associated with the first control resource set, where the second control resource set is one of the plurality of control resource sets configured before determining the link failure of the first control resource set, and the quality of the reference signal corresponding to the second control resource set is greater than or equal to the second threshold.

The second control resource set may be, for example, a control resource set configured by radio resource control (RRC) signaling. When the control resource set configured by the RRC signaling is available, the terminal device may detect the non-broadcast search space on the control resource set configured by the RRC signaling. In this way, the network device does not need to reconfigure the non-broadcast search space of the first control resource set by using additional signaling. This reduces signaling overheads and improves link recovery efficiency of the first control resource set.

The network device may directly send the link failure recovery request response by using the second control resource set, or may not send the link failure recovery request response, but sends DCI by using the second control resource set. When the terminal device detects, on the second control resource set, the search space associated with the first control resource set, and obtains the DCI, the terminal device may determine that the link failure recovery request response is received (where the DCI is equivalent to the link failure recovery request response). Alternatively, the network device may send the DCI by using the second control resource set after sending the link failure recovery request response.

Optionally, the method further includes: receiving a link failure recovery request response on a fourth control resource set; and/or detecting, on the fourth control resource set, the non-broadcast search space set associated with the first control resource set, where the fourth control resource set is a control resource set specifically used for receiving the link failure recovery request response.

The fourth control resource set is a control resource set specially configured for recovering the communication link. In other words, the fourth control resource set is a control resource set that is configured before the link failure occurs and that is specifically used for link failure recovery. The terminal device may determine, based on a control resource set used for receiving information, or a search space set associated with the control resource set, whether the received information is a normal data scheduling response or the link failure recovery request response. After determining the link failure of the first control resource set, the network device returns the communication failure recovery request response to the terminal device by using the fourth control resource set, and a DMRS of the fourth control resource set and the reference signal that is used to recover the link and that is included in the link failure recovery request satisfy a QCL relationship. The terminal device may detect, based on the control resource set (namely, the fourth control resource set) configured by the network device, the non-broadcast search space set associated with the first control resource set, so that the terminal device can still receive an important system message in the link failure recovery process. According to the method, before the new control resource set being configured by the network device, the terminal device may detect in the search space set associated with the first control resource set in advance, to receive related information. This improves link recovery efficiency of the first control resource set.

Optionally, a DCI format of the non-broadcast search space set includes a DCI format 2_0 and/or a DCI format 2_1; or a cyclic redundancy check (CRC) of DCI detected in the non-broadcast search space set is scrambled by slot format indication radio network temporary identifier (SFI-RNTI) and/or interruption radio network temporary identifier (INT-RNTI), and the CRC of the DCI is a CRC generated by using an information bit of the DCI.

A CRC of the DCI format 2_0 is scrambled by SFI-RNTI, and is mainly used to send a slot format. A CRC of the DCI format 2_1 is scrambled by INT-RNTI, and is mainly used to notify the terminal device of a location of rate-matching (a puncturing location during transmission of ultra-reliable low-latency communication (URLLC) service data). The information is used for data demodulation and reference signal receiving or sending. Therefore, associating the fourth control resource with a corresponding search space can ensure that the important information used to indicate the slot format or pre-emption information can also be received in the link failure recovery process, to correctly receive data and a reference signal.

Optionally, the method further includes: detecting, on a fifth control resource set, the non-broadcast search space set associated with the first control resource set (including all or a part of non-broadcast search space sets associated with the first control resource set), where the fifth control resource set is a control resource set configured after determining the link failure of the first control resource set.

The fifth control resource set is a control resource set newly configured after the link failure of the first control resource set occurs, or the fifth control resource set is the first control resource set for which a QCL/TCI is reconfigured. According to the method, the network device may find a downlink with relatively good channel quality from a plurality of downlinks reported by the terminal device, and configure the downlink for the terminal device. The terminal device may detect, on the new control resource set that has relatively good performance and that is configured by the network device, the search space set associated with the first control resource set. This improves receiving performance. Optionally, the search space set that is associated with the first control resource set and that is detected on the fifth control resource set includes a search space set scrambled by SFI-RNTI and/or INT-RNTI.

Optionally, sending the link failure recovery request includes: sending the link failure recovery request through a physical uplink control channel (PUCCH), where the PUCCH is used to carry channel quality information and/or scheduling request information.

The terminal device may reuse the PUCCH carrying the channel quality information and/or the scheduling request information, to send the link failure recovery request. For example, a special status bit of a field of a beam report is used to distinguish whether sent information is a beam report or a link failure recovery request. The special status bit is, for example, a reserved bit, a least significant bit, or a most significant bit in absolute or reference 7 bits. This improves utilization of air interface resources.

Optionally, the channel quality information is reporting information used for beam management (reporting of beam management information), including reference signal received power (RSRP) related information, or channel quality indicator (CQI) related information used for link adaptation.

The reference signal received power related information includes at least one of RSRP, a reference signal resource index (such as a CSI-RS resource indicator (CRI), or an SSB resource indicator (SSBRI)), and reference signal received quality (RSRQ). The channel quality indicator related information includes at least one of a reference signal resource index (such as a CRI), a precoding matrix indicator (PMI), a rank indicator (RI), a channel quality indicator (CQI), and a layer indicator (LI).

The scheduling request information includes the following two cases. In one case, 1 bit is used to indicate whether to request data scheduling. In other words, two states (the 1 bit has two states "0" and "1") are used to indicate whether to request data scheduling. In the other case, whether there is a sequence (on/off) is used to indicate whether to request data scheduling. If there is data scheduling, the sequence is sent. If there is no data scheduling, the sequence is not sent.

Optionally, sending the link failure recovery request includes: sending the link failure recovery request through a physical random access channel (PRACH), where the PRACH has an association relationship with the third reference signal, and the third reference signal is a reference signal for recovering the communication link of the first control resource set.

The foregoing association relationship means that the network device configures the third reference signal in a PRACH resource by using RRC signaling. When uplink and downlink beams have reciprocity, the terminal device may send the link failure recovery request through a beam corresponding to the third reference signal. The PRACH may be a PRACH configured in a contention-based random access scenario (namely, a contention-based PRACH resource), or may be a PRACH configured in a non-contention-based random access scenario (namely, a non-contention-based PRACH resource). When the contention-based PRACH resource is used, because the contention-based PRACH resource is used for initial access, reusing the PRACH resource can reduce overheads. If the non-contention-based PRACH resource is used, the network device configures the PRACH resource for the terminal device separately. Because the terminal device does not need to contend with another user, a time for sending the link failure recovery request can be reduced.

According to a second aspect, another link recovery method is provided. The method includes: receiving a link failure recovery request, where the link failure recovery request is used to request to recover a communication link of a first control resource set, and the first control resource set is a control resource set configured by a first MIB; and configuring a control resource set and/or a reception parameter based on the link failure recovery request, where the control resource set is used to detect in a non-broadcast search space set associated with the first control resource set.

The first control resource set may be a CORESET, a control region, or an ePDCCH set defined in a 5G mobile communications system, or may be a resource set that is defined in another mobile communications system (for example, a sixth-generation mobile communications system) and that carries a PDCCH. When the network device learns that a link failure occurs on the communication link of the first control resource set, the network device may configure the control resource set and/or the reception parameter, to quickly recover the communication link of the control resource set configured by the MIB.

Optionally, the control resource set is one of a plurality of control resource sets configured before receiving the link failure recovery request, and quality of a reference signal corresponding to the control resource set is greater than or equal to a first threshold and/or a second threshold.

The control resource set may be, for example, a control resource set configured by RRC signaling. When the control resource set configured by the RRC signaling is available, a terminal device may detect in a non-broadcast search space on the control resource set configured by the RRC signaling. In this way, the network device does not need to reconfigure the non-broadcast search space of the first control resource set by using additional signaling. This reduces signaling overheads and improves link recovery efficiency of the first control resource set.

Optionally, the control resource set is a control resource set configured after receiving the link failure recovery request.

The control resource set is, for example, the fifth control resource set described in the first aspect, and the fifth control resource set is a control resource set newly configured after the link failure of the first control resource set occurs, or the fifth control resource set is the first control resource set for which a QCL/TCI is reconfigured. According to the method, the network device may find a downlink with relatively good channel quality from a plurality of downlinks reported by the terminal device, and configure the downlink for the terminal device. The terminal device may detect, on the new control resource set that has relatively good performance and that is configured by the network device, the search space set associated with the first control resource set. This improves system performance.

Optionally, receiving the link failure recovery request includes: receiving the link failure recovery request including a third reference signal, where the third reference signal is a reference signal for recovering the communication link of the first control resource set; and configuring the control resource set and/or the reception parameter based on the link failure recovery request includes: configuring, based on the link failure recovery request, the control resource set and/or the reception parameter that are/is associated with the third reference signal.

The third reference signal is, for example, an SSB used to indicate a reception parameter associated with a second control resource set (namely, a control resource set for detecting the non-broadcast search space set associated with the first control resource set). The network device recovers the communication link of the first control resource set based on the SSB, and does not need to reconfigure the non-broadcast search space of the first control resource set by using additional signaling. This reduces signaling overheads and improves link recovery efficiency of the first control resource set.

Optionally, receiving the link failure recovery request includes: receiving the link failure recovery request through a PUCCH, where the PUCCH is used to carry channel quality information and/or scheduling request information.

The network device may reuse the PUCCH carrying the channel quality information and/or the scheduling request information, to receive the link failure recovery request. For example, a special status bit of a field of a beam report is used to distinguish whether sent information is a beam report or a link failure recovery request. The special status bit is, for example, a reserved bit, a least significant bit, or a most significant bit in absolute or reference 7 bits. This improves utilization of air interface resources.

Optionally, receiving the link failure recovery request includes: receiving the link failure recovery request through a PRACH, where the PRACH has an association relationship with the third reference signal, and the third reference signal is the reference signal for recovering the communication link of the first control resource set.

The foregoing association relationship means that the network device configures the third reference signal in a PRACH resource by using RRC signaling. When uplink and downlink beams have reciprocity, the terminal device may send the link failure request through a beam corresponding to the third reference signal. The PRACH may be a PRACH configured in a contention-based random access scenario (namely, a contention-based PRACH resource), or may be a PRACH configured in a non-contention-based random access scenario (namely, a non-contention-based PRACH resource). When the contention-based PRACH resource is used, because the contention-based PRACH resource is used for initial access, reusing the PRACH resource can reduce overheads. If the non-contention-based PRACH resource is used, the network device configures the PRACH resource for the terminal device separately. Because the terminal device does not need to contend with another user, a time for sending the link failure recovery request can be reduced.

Optionally, the method further includes: sending a link failure recovery request response on the control resource set; and/or sending, on the control resource set, the non-broadcast search space set associated with the first control resource set.

The control resource set may be the second control resource set or a third control resource set. When the control resource set is the second control resource set, the second control resource set may be, for example, a control resource set configured by radio resource control (RRC) signaling. When the control resource set configured by the RRC signaling is available, the terminal device may detect the non-broadcast search space on the control resource set configured by the RRC signaling. In this way, the network device does not need to reconfigure the non-broadcast search space of the first control resource set by using additional signaling. This reduces signaling overheads and improves link recovery efficiency of the first control resource set. When the control resource set is the third control resource set, the network device may directly send the link failure recovery request response by using the third control resource set, or may not send the link failure recovery request response, but sends DCI by using the third control resource set. When the terminal device detects, on the third control resource set, the search space associated with the first control resource set, and obtains the DCI, the terminal device may determine that the link failure recovery request response is received (where the DCI is equivalent to the link failure recovery request response). Alternatively, the network device may send the DCI by using the third control resource set after sending the link failure recovery request response. In the foregoing method, the link recovery request including the third reference signal implicitly indicates a parameter (namely, the reception parameter indicated by the third reference signal) used by the terminal device to detect the non-broadcast search space, and the network device does not need to reconfigure the non-broadcast search space of the first control resource set. This reduces signaling overheads and improves link recovery efficiency of the first control resource set.

Optionally, the method further includes: sending a link failure recovery request response on a fourth control resource set; and/or sending, on the fourth control resource set, the non-broadcast search space set associated with the first control resource set, where the fourth control resource set is a control resource set specifically used for sending the link failure recovery request response.

The fourth control resource set is a control resource set specially configured by the network device for recovering the communication link. In other words, the fourth control resource set is a control resource set that is configured before the link failure occurs and that is specifically used for link failure recovery. The terminal device may determine, based on a control resource set used for receiving information, or a search space set associated with the control resource set, whether the received information is a normal data scheduling response or the link failure recovery request response. After determining the link failure of the first control resource set, the network device returns the communication failure recovery request response to the terminal device by using the fourth control resource set. A DMRS of the fourth control resource set and the reference signal that is used to recover the link and that is included in the link failure recovery request satisfy a QCL relationship. The terminal device may detect, based on the control resource set (namely, the fourth control resource set) reconfigured by the network device, in the non-broadcast search space set associated with the first control resource set. According to the method, before the new control resource set being configured by the network device, the terminal device may detect in the search space set associated with the first control resource set in advance, to receive related information. This improves link recovery efficiency of the first control resource set.

Optionally, a DCI format of the non-broadcast search space set includes a DCI format 2_0 and/or a DCI format 2_1; or a cyclic redundancy check CRC of DCI detected in the non-broadcast search space set is scrambled by slot format indication radio network temporary identifier SFI-RNTI and/or interruption radio network temporary identifier INT-RNTI.

The cyclic redundancy check (CRC) of the DCI detected in the non-broadcast search space set is scrambled by slot format indication radio network temporary identifier (SFI-RNTI) and/or interruption radio network temporary identifier (INT-RNTI), and the CRC of the DCI is a CRC generated by using an information bit of the DCI.

A CRC of the DCI format 2_0 is scrambled by SFI-RNTI, and is mainly used to send a slot format. A CRC of the DCI format 2_1 is scrambled by INT-RNTI, and is mainly used to notify the terminal device of a location of rate-matching (a puncturing location during transmission of ultra-reliable low-latency communication (URLLC) service data). The information is used for data demodulation and reference signal receiving or sending. Therefore, associating the fourth control resource with a corresponding search space can ensure that the important information used to indicate the slot format or pre-emption information can also be received in the link failure recovery process, to correctly receive data and a reference signal.

Optionally, the method further includes: sending, on a fifth control resource set, the non-broadcast search space set associated with the first control resource set, where the fifth control resource set is a control resource set configured after determining the link failure of the first control resource set.

The fifth control resource set is a control resource set newly configured after the link failure of the first control resource set occurs, or the fifth control resource set is the first control resource set for which a QCL/TCI is reconfigured. According to the method, the network device may find a downlink with relatively good channel quality from a plurality of downlinks reported by the terminal device, and configure the downlink for the terminal device. The terminal device may detect, on the new control resource set that has relatively good performance and that is configured by the network device, the search space set associated with the first control resource set. This improves receiving performance. Optionally, the search space set that is associated with the first control resource set and that is detected on the fifth control resource set includes a search space set scrambled by SFI-RNTI and/or INT-RNTI.

According to a third aspect, this application provides a link recovery apparatus. The apparatus may be a communications device (for example, a terminal device), or may be a chip in a communications device. The apparatus may include a processing unit and a transceiver unit. When the apparatus is a communications device, the processing unit may be a processor, and the transceiver unit may be a transceiver. The communications device may further include a storage unit, and the storage unit may be a memory. The storage unit is configured to store an instruction, and the processing unit executes the instruction stored in the storage unit, to enable the communications device to perform the method according to the first aspect. When the apparatus is a chip in a communications device, the processing unit may be a processor, and the transceiver unit may be an input/output interface, a pin, a circuit, or the like. The processing unit executes an instruction stored in a storage unit, to enable the communications device to perform the method according to the first aspect. The storage unit may be a storage unit (for example, a register or a cache) in the chip, or may be a storage unit (for example, a read-only memory or a random access memory) that is inside the communications device and that is located outside the chip.

According to a fourth aspect, another link recovery apparatus is provided. The apparatus may be a communications device (for example, a network device), or may be a chip in a communications device. The apparatus may include a processing unit and a transceiver unit. When the apparatus is a communications device, the processing unit may be a processor, and the transceiver unit may be a transceiver. The communications device may further include a storage unit, and the storage unit may be a memory. The storage unit is configured to store an instruction, and the processing unit executes the instruction stored in the storage unit, to enable the communications device to perform the method according to the second aspect. When the apparatus is a chip in a communications device, the processing unit may be a processor, and the transceiver unit may be an input/output interface, a pin, a circuit, or the like. The processing unit executes an instruction stored in a storage unit, to enable the communications device to perform the method according to the second aspect. The storage unit may be a storage unit (for example, a register or a cache) in the chip, or may be a storage unit (for example, a read-only memory or a random access memory) that is inside the communications device and that is located outside the chip.

According to a fifth aspect, a network system is provided. The network system includes the link recovery apparatus according to the third aspect and the link recovery apparatus according to the fourth aspect.

According to a sixth aspect, a computer program product is provided. The computer program product includes computer program code. When the computer program code is run by a communications unit and a processing unit, or a transceiver and a processor of a terminal device, the terminal device is enabled to perform the method according to the first aspect.

According to a seventh aspect, a computer program product is provided. The computer program product includes computer program code. When the computer program code is run by a communications unit and a processing unit, or a transceiver and a processor of a network device, the network device is enabled to perform the method according to the second aspect.

According to an eighth aspect, a computer storage medium is provided. The computer storage medium is configured to store a computer software instruction used by the foregoing terminal device, and the computer software instruction includes a program designed to perform the method of the first aspect.

According to a ninth aspect, a computer storage medium is provided. The computer storage medium is configured to store a computer software instruction used by the foregoing network device, and the computer software instruction includes a program designed to perform the method of the second aspect.

According to a tenth aspect, a chip is provided. The chip stores an instruction. When the instruction is run on a terminal device, the chip is enabled to perform the method of the first aspect.

According to an eleventh aspect, a chip is provided. The chip stores an instruction. When the instruction is run on a network device, the chip is enabled to perform the method of the second aspect.

DESCRIPTION OF EMBODIMENTS

Figure 1:
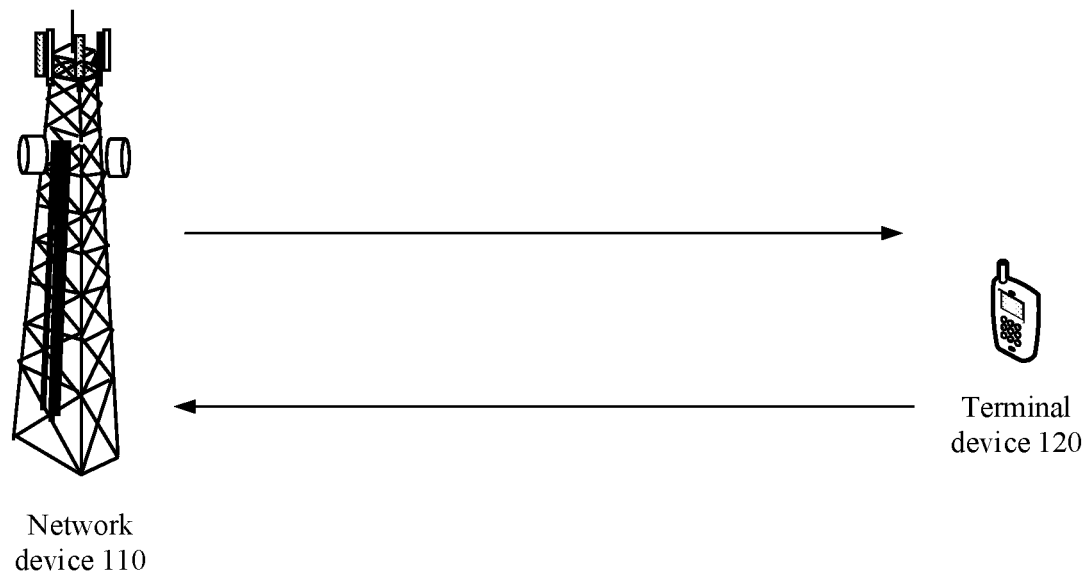
FIG. 1 is a schematic diagram of a communications system applicable to this application.

FIG. 1 shows a communications system 100 applicable to this application. The communications system 100 includes a network device 110 and a terminal device 120. The network device 110 and the terminal device 120 communicate with each other through a wireless network. When the terminal device 120 sends data, a wireless communications module may encode information for transmission. Specifically, the wireless communications module may obtain a particular quantity of information bits to be sent to the network device 110 through a channel. These information bits are, for example, information bits generated by a processing module, received from another device, or stored in a storage module.

When a transmission direction of the communications system 100 is uplink transmission, the terminal device 120 is a transmit end, and the network device 110 is a receive end. When a transmission direction of the communications system 100 is downlink transmission, the network device 110 is a transmit end, and the terminal device 120 is a receive end.

Technical solutions provided in this application may be applied to various communications systems, for example, a 5G mobile communications system. The 5G mobile communications system in this application includes a non-standalone (NSA) 5G mobile communications system and/or a standalone (SA) 5G mobile communications system. The technical solutions provided in this application may alternatively be applied to a future communications system, for example, a sixth-generation mobile communications system.

In this application, the terminal device may be referred to as an access terminal, user equipment (UE), a subscriber unit, a subscriber station, a mobile station, a remote station, a remote terminal, a mobile device, a user terminal, a terminal, a wireless communications device, a user agent, or a user apparatus. The access terminal may be a cellular phone, a handheld device having a wireless communication function, a computing device, another processing device connected to a wireless modem, a vehicle-mounted device, a wearable device, or user equipment in the 5G communications system.

The network device may be a base transceiver station (BTS) in a code division multiple access (CDMA) system, a NodeB (NB) in a wideband code division multiple access (WCDMA) system, an evolved NodeB (eNB) in a long term evolution (LTE) system, or a gNB in the 5G mobile communications system. The foregoing base stations are only used as examples for description. Alternatively, the network device may be a relay node, an access point, a vehicle-mounted device, a wearable device, or another type of device.

The foregoing communications system applicable to this application is merely an example for description, and the communications system applicable to this application is not limited thereto. For example, the communications system may include another quantity of network devices and another quantity of terminal devices.

For ease of understanding of this application, before a link recovery method provided in this application is described, concepts in this application are first briefly described.

In this application, beams may be classified into a transmit beam and a receive beam of the network device, and a transmit beam and a receive beam of the terminal device. The transmit beam of the network device is used to describe transmit-side beamforming information of the network device, and the receive beam of the base station is used to describe receive-side beamforming information of the network device. The transmit beam of the terminal device is used to describe transmit-side beamforming information of the terminal device, and the receive beam of the terminal is used to describe receive-side beamforming information of the terminal device. That is, the beam is used to describe beamforming information.

In this application, the beam may correspond to a time resource, and/or a space resource, and/or a frequency domain resource.

Optionally, the beam may alternatively correspond to a reference signal resource (for example, a reference signal resource for beamforming) or beamforming information.

Optionally, the beam may alternatively correspond to information associated with a reference signal resource of the network device. A reference signal may be a CSI-RS, an SSB, a DMRS, a phase tracking reference signal (PTRS), a tracking signal (TRS), or the like. The information associated with the reference signal resource may be a reference signal resource identifier, QCL information, or the like.

The reference signal resource identifier corresponds to a transmit-receive beam pair that is previously established during measurement based on the reference signal resource. The terminal may infer beam information based on the reference signal resource identifier.

Figure 2:
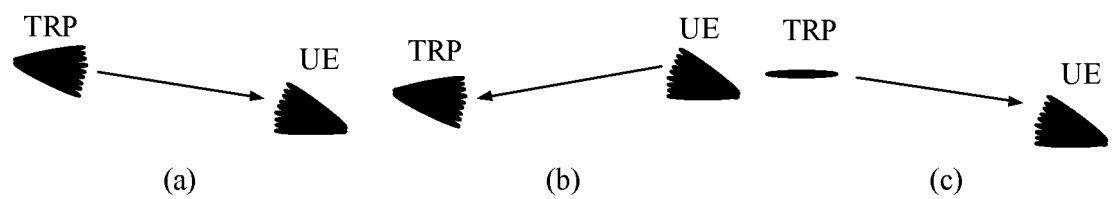
FIG. 2 is a schematic diagram of a beam training process applicable to this application.
Figure 2:
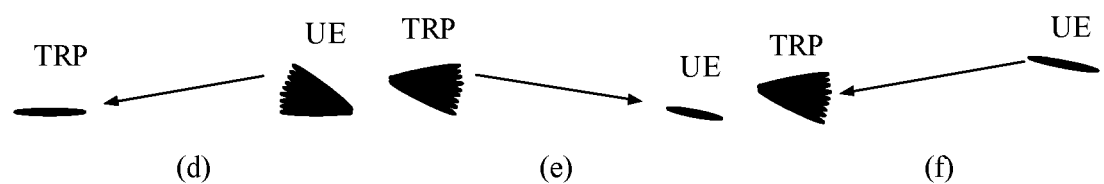

FIG. 2 shows a beam training process applicable to this application. In FIG. 2, a TRP is an English abbreviation of a transmission reference point.

Selection of a beam pair: As shown in (a) and (b) in FIG. 2, in the beam training process, N optimal beam pair links (BPL) are first selected through beam sweeping. One BPL includes one base station transmit beam and one terminal receive beam, or one BPL includes one terminal transmit beam and one base station receive beam. A terminal device selects a base station transmit beam and/or a terminal receive beam based on beam sweeping performed by a network device, and the network device selects a terminal transmit beam and/or a base station receive beam based on beam sweeping of the terminal device.

Updating of a transmit beam: The transmit beam may be a base station transmit beam or a terminal transmit beam. When the transmit beam is the base station transmit beam, as shown in (e) in FIG. 2, the base station sends reference signals to UE through different transmit beams, and the UE receives, through one receive beam, the reference signals sent by the base station through the different transmit beams, determines an optimal base station transmit beam based on the received signals, and then feeds back the optimal base station transmit beam to the base station, so that the base station updates the transmit beam. When the transmit beam is the terminal transmit beam, as shown in (d) in FIG. 2, the UE sends reference signals to the base station through different transmit beams, and the base station receives, through a same receive beam, the reference signals sent by the UE through the different transmit beams, determines an optimal UE transmit beam based on the received signals, and then feeds back the optimal UE transmit beam to the UE, so that the UE updates the transmit beam. The process of sending the reference signals through the different transmit beams may be referred to as beam sweeping, and the process of determining the optimal transmit beam based on the received signals may be referred to as beam matching.

Updating of a receive beam: The receive beam may be a base station receive beam or a terminal receive beam. When the receive beam is the base station receive beam, as shown in (f) in FIG. 2, the UE sends reference signals to the base station through a same transmit beam, and the base station receives, through different receive beams, the reference signals sent by the UE, and then determines an optimal base station receive beam based on the received signals, to update the base station receive beam. When the receive beam is the UE receive beam, as shown in (c) in FIG. 2, the base station sends reference signals to the UE through a same transmit beam, and the UE receives, through different receive beams, the reference signals sent by the base station, and then determines an optimal UE receive beam based on the received signals, to update the UE receive beam.

During downlink signal transmission, both the base station transmit beam and the terminal receive beam may dynamically change, and there may be a plurality of optimal receive beams determined by the terminal device based on the received signals. To enable the terminal device to determine a receive beam of the terminal device, the terminal device may feed back information about the plurality of receive beams to the base station, and the base station may indicate the terminal receive beam to the terminal device by sending beam indication information to the terminal device. When the terminal device uses analog beamforming, the terminal device may precisely determine the terminal receive beam based on the beam indication information sent by the network device. Therefore, a beam sweeping time of the terminal device can be shortened, and power is saved.

Through the beam training process, the base station obtains N optimal BPLs used for communication with the UE. The BPL is <Bx, B'x>, where Bx represents the base station transmit beam, and B'x represents the UE receive beam. Alternatively, the BPL is <By, B'y>, where By represents the UE transmit beam, and B'y represents the base station receive beam. In a subsequent process of communication with the UE, the base station uses the N BPLs for data transmission. However, an obstacle exists in a communication process, and a diffraction capability on a high frequency channel is poor. Consequently, a current serving beam is blocked, and signal transmission cannot proceed. To prevent sudden communication interruption caused by beam blocking, a corresponding mechanism needs to be introduced to detect beam quality and quickly recover a link when the beam is blocked.

To detect a communication link and recover the communication link, the network device needs to configure, for the terminal, a link failure detection reference signal resource used for link failure detection (namely, beam failure detection). The link failure detection reference signal resource may be referred to as a beam failure detection reference signal resource configuration (Beam-Failure-Detection-RS-ResourceConfig), a beam failure detection reference signal (Beam-Failure-Detection-RS), or a beam failure detection resource (Failure-Detection-Resources). The network device further needs to configure, for the terminal device, a candidate reference signal resource used for communication link recovery. The candidate reference signal resource may be referred to as a candidate beam reference signal list (candidate beam RS list), a candidate beam reference signal identifier resource (Beam-Failure-Candidate-Beam-Resource), a candidate beam identifier reference signal (Candidate-Beam-Identification-RS), or a reference signal resource for identifying a new link.

During specific implementation, the reference signal resource used for link failure detection and the candidate reference signal resource may have other names. This is not specifically limited in this application.

The signal, the signal set, or the resource may be configured in an explicit manner (by using dedicated signaling, for example, at least one of RRC, a MAC-CE, and DCI). In addition, the reference signal used for link failure detection may alternatively be indicated in an implicit manner. A reference signal associated with a transmission configuration indicator (TCI) indicating a PDCCH/CORESET is used as the reference signal used link failure detection, the reference signal is a reference signal included in a type D QCL that has a quasi co-location assumption relationship with a demodulation reference signal (DMRS) of the PDCCH (Type D QCLed with PDCCH DMRS), and the reference signal is a periodically sent signal.

For example, an RS in a beam failure detection reference signal set (Beam-Failure-Detection-RS set) has a quasi co-location (QCL) relationship with the DMRS of the PDCCH, or uses a same TCI state as the PDCCH. When channel quality information (for example, one or more of reference signal received power RSRP, reference signal received quality RSRQ, a block error ratio (BLER), a signal to interference plus noise ratio (SINR), a signal to noise ratio (SNR), and a channel quality indicator CQI) of a part or all of reference signals in the set is less than a first threshold, it is determined that the communication link is faulty. Being less than the preset threshold may be being less than the preset threshold for N consecutive times or being less than the preset threshold for N times in a time period. Optionally, the preset threshold may be the same as a radio link detecting out-of-synchronization threshold (RLM OOS thresholdConfig/rlmInSyncOutOfSyncThreshold).

In this application, the link failure may also be referred to as a communication link failure, a communication link fault, a beam fault, a beam failure, a link fault, a communication fault, a communication failure, or the like. In this specification, these concepts have the same meaning. After the link failure occurs, the terminal selects, from candidate reference signal resources, a reference signal resource whose channel quality indicated by information (for example, one or more of the reference signal received power RSRP, the reference signal received quality RSRQ, the block error ratio BLER, the signal to interference plus noise ratio SINR, the signal to noise ratio SNR, and the channel quality indicator CQI) is greater than the preset threshold, to recover the link. Optionally, the preset threshold may be configured by the network device. In this application, link recovery may also be referred to as recovery of communication between the network device and the terminal device, link failure recovery, beam failure recovery, communication link failure recovery, link fault recovery, communication fault recovery or communication failure recovery, link recovery, link reconfiguration, communication link recovery, beam fault recovery, or the like.

Figure 3:
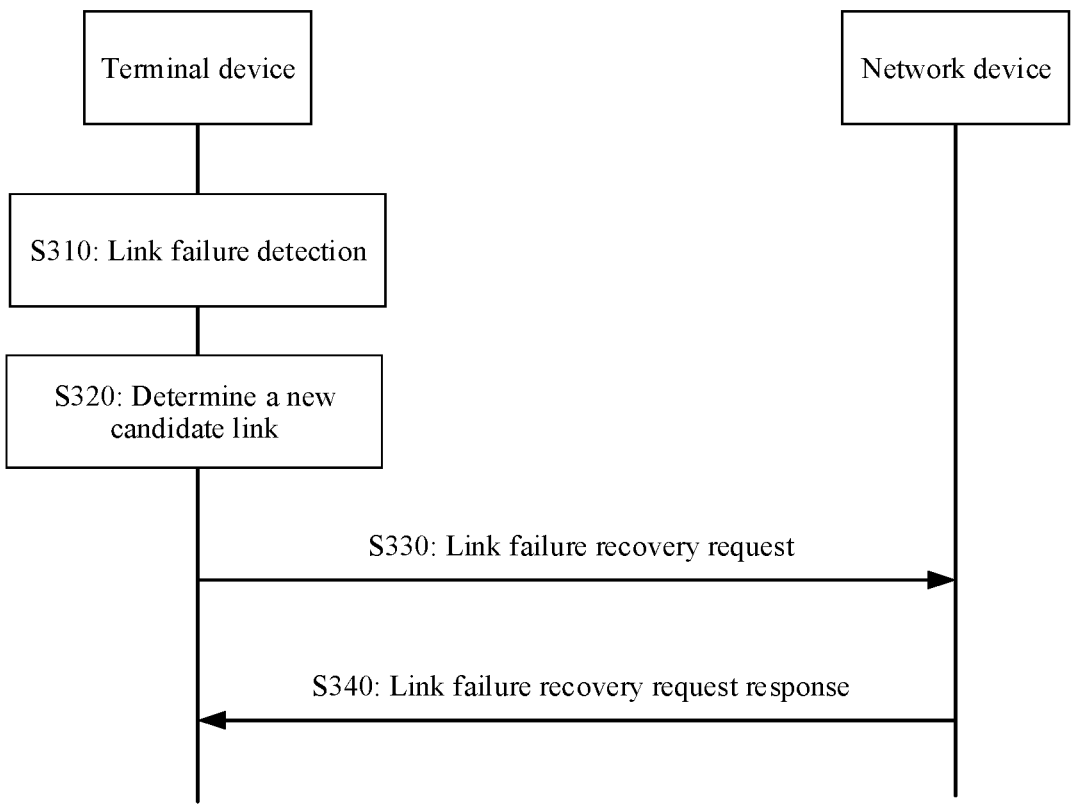
FIG. 3 is a schematic flowchart of a link recovery method according to this application.

FIG. 3 is a schematic flowchart of a communication link recovery method applicable to this application. The method 300 includes the following steps.

S310: Link failure detection. For example, a terminal device measures a reference signal in a beam failure detection reference signal set (beam failure detection RS set), and if results of N consecutive detections are failures or channel quality (which may also be referred to as "signal quality") of all reference signals in the beam failure detection reference signal set is less than a preset threshold, the terminal device determines that a status of a current beam is a beam failure.

It should be noted that, when the terminal device detects that signal quality of a downlink reference signal sent by a network device through a transmit beam deteriorates, it indicates that a communication link fault occurs on the transmit beam of the network device. Herein, the transmit beam is a transmit beam used by the network device to communicate with the terminal device. A cause of the communication link fault on the transmit beam of the network device includes but is not limited to the following: An obstacle exists in a communication process, and a diffraction capability in a high frequency channel is poor. Consequently, the current serving beam is blocked, and the signal transmission cannot proceed. That the signal quality deteriorates may be that channel quality information (such as RSRP and a CQI) is less than the preset threshold.

S310 may include the following implementations.

S410: Determine a link failure of a first control resource set, where the first control resource set is a control resource set configured by a first MIB.

The first control resource set is, for example, a CORESET, a control region, or an ePDCCH set that is associated with a common search space and that is configured by the first MIB. For brevity, the link recovery method provided in this application is described below by using an example in which the first control resource set is the CORESET. The first MIB is any MIB, and may be the same as or different from a second MIB described below. The first MIB and the second MIB do not constitute a limitation on the MIB. Similarly, the first control resource set does not constitute a limitation on the control resource set.

"Determining a link failure of a first control resource set" may be understood as determining that a communication link of the first control resource set is in a link failure state, determining that a link failure occurs on a communication link of the first control resource set, or another explanation with an equivalent meaning.

When the first control resource set is the CORESET, an identifier of the CORESET may be 0, that is, the first control resource set may be a CORESET 0. The CORESET 0 is mainly used to schedule, during initial access, one or more of remaining system information (RMSI), other system information (OSI), a paging message, and a random access message (including a second message (Message 2) or a fourth message (Message 4)). If the CORESET 0 is on an active bandwidth part (active BWP), the network device may still schedule the data by using the CORESET 0 after the initial access. Optionally, the CORESET 0 may further be associated with a UE specific search space (USS). Alternatively, the common search space may be associated with another CORESET. One SSB is associated with one CORESET 0, and the terminal device detects the common search space (CSS) on the CORESET 0 associated with the SSB.

When the terminal device detects that the link failure occurs on the communication link of the first control resource set, the terminal device may send, to the network device, a request message used to request to recover the first control resource set, that is, perform S330 described below. In this way, the communication link of the control resource set configured by the MIB can be quickly recovered.

It should be noted that, in this application, an execution sequence of a former step and a latter step is not limited. After the former step is executed, the latter step may be executed immediately, or may be executed after a time period. In addition, there may be another step between the former step and the latter step. For example, after the link failure of the first control resource set occurs, the terminal device may alternatively first search for a new downlink, then search for a corresponding uplink resource, and then send a link failure recovery request.

Optionally, 5410 includes:

determining a search space set associated with the first control resource set (optional step);

determining a link failure detection mode of the communication link of the first control resource set based on the search space set associated with the first control resource set; and determining the link failure on the communication link of the first control resource set based on the link failure detection mode.

The search space set associated with the first control resource set may be understood as follows: A PDCCH in the search space includes one or more control channel elements (CCE), the one or more CCEs are mapped to a plurality of resource element groups (REG), and the plurality of REGs are in the first control resource set.

An association relationship between the first control resource set and the search space set is configured by the MIB or RRC signaling, or is a predefined relationship.

In this application, one CCE may correspondingly include a plurality of REGs, and a quantity of REGs corresponding to one CCE may be fixed, for example, 6. One REG includes 12 contiguous subcarriers in frequency domain, and occupies one orthogonal frequency division multiplexing (OFDM) symbol in time domain.

The search space associated with the first control resource set may have different types. For example, the search space associated with the first control resource set may be a broadcast search space and/or a non-broadcast search space. When the search space associated with the first control resource set is the broadcast search space, because a beam associated with the CORESET 0 (namely, the CORESET configured by the first MIB) associated with the broadcast search space is a cell specific beam, the base station repeatedly sends same broadcast information on the CORESET 0 corresponding to a plurality of synchronization signal/physical broadcast channel blocks (SSB). If the link failure occurs, the terminal device may automatically switch between the SSBs, and the base station does not need to reconfigure quasi co-location (QCL) information of the CORESET 0. Therefore, the user equipment does not need to detect an SSB of the broadcast search space. When the search space associated with the first control resource set is the non-broadcast search space (for example, a UE specific search space), because content sent in the non-broadcast search space is user equipment specific (UE specific) content or user equipment group common (UE group common) content, the base station does not send same non-broadcast information on the CORESET 0 corresponding to each SSB. In this case, the base station notifies the user equipment of an SSB used for the non-broadcast search space, so that the user equipment detects whether the link failure occurs on the CORESET 0 associated with the non-broadcast search space. If the link failure occurs, the user equipment needs to notify the base station to reconfigure a beam or the CORESET corresponding to the non-broadcast search space. In the foregoing method, whether the link failure occurs on the communication link of the first control resource set is detected based on a type of the search space associated with the first control resource set. This can improve link recovery efficiency.

Optionally, a CRC of downlink control information (DCI) detected in the non-broadcast search space in a non-broadcast search space set is scrambled by at least one of the following information:

random access RNTI (RA-RNTI), temporary cell RNTI (TC-RNTI), cell RNTI (C-RNTI), interruption RNTI (INT-RNTI), slot format indication RNTI (SFI-RNTI), transmit power control physical uplink shared channel RNTI (TPC-PUSCH-RNTI), transmit power control physical uplink control channel RNTI (TPC-PUCCH-RNTI), transmit power control sounding reference symbols RNTI (TPC-SRS-RNTI), configured scheduling RNTI (CS-RNTI), and semi-persistent channel state information RNTI (SP-CSI-RNTI)

Optionally, a CRC of DCI detected in a common search space included in the non-broadcast search space set is scrambled by at least one of the following information:

INT-RNTI, SFI-RNTI, TPC-PUSCH-RNTI, TPC-PUCCH-RNTI, TPC-SRS-RNTI, C-RNTI, CS-RNTI(s), and SP-CSI-RNTI; and/or a CRC of DCI detected in the terminal specific search space (UE specific search space) included in the non-broadcast search space set is scrambled by at least one of the following information:

C-RNTI, CS-RNTI(s), and SP-CSI-RNTI.

Optionally, when the search space is the non-broadcast search space, a reference signal resource set used for link failure detection of the first control resource set includes a first reference signal and a second reference signal, the first reference signal is used for link failure detection of a control resource set configured by non-MIB information, and the second reference signal is used to indicate a reception parameter associated with the first control resource set.

The first reference signal is carried on a first reference signal resource, and there is one or more first reference signals. Therefore, the first reference signals may also be referred to as a first reference signal resource set. Similarly, the second reference signal is carried on a second reference signal resource, and there is one or more second reference signals. Therefore, the second reference signals may also be referred to as a second reference signal resource set.

The first reference signal belongs to a reference signal set that is preconfigured by the network device and that is used to detect whether the link failure occurs on the communication link of the first control resource set, and the second reference signal is, for example, a synchronization signal/physical broadcast channel block (SSB). The terminal device may detect whether signal quality (for example, a signal to noise ratio) of the first reference signal and signal quality of the second reference signal are less than or equal to a first threshold. When both the signal quality of the first reference signal and the signal quality of the second reference signal are less than or equal to the first threshold, the terminal device determines that the link failure occurs on the communication link of the first control resource set. That "both the signal quality of the first reference signal and the signal quality of the second reference signal are less than or equal to the first threshold" includes: Signal quality of at least one or all of the first reference signals is less than or equal to the first threshold, and signal quality of at least one or all of the second reference signals is less than or equal to the first threshold. According to the method, a specific reference signal does not need to be selected for detection. The method is easy to implement and has better compatibility. The compatibility means that a link failure recovery procedure of another CORESET (a CORESET other than the CORESET 0) may be directly reused in the method, including reusing procedures of sending a link failure recovery request and receiving a link failure recovery request response for the another CORESET.

Alternatively, the terminal device may detect only whether signal quality (for example, a signal to noise ratio) of the second reference signal is less than or equal to a first threshold. When the signal quality of the second reference signal is less than or equal to the first threshold, the terminal device determines that the link failure occurs on the communication link of the first control resource set. That "the signal quality of the second reference signal is less than or equal to the first threshold" includes: Signal quality of at least one or all of the second reference signals is less than or equal to the first threshold. The first reference signal does not need to be used in combination to determine whether the link failure occurs, and whether to initiate the link failure recovery request. Therefore, complexity of determining the link failure on the communication link of the first control resource set by the terminal device is reduced.

In this application, the "reception parameter" is a parameter for receiving a signal, for example, a TCI, a QCL, a type D (type D) QCL, or a spatial reception parameter (spatial Rx parameter), or may be another parameter.

In this application, the SSB may also be referred to as an SS/PBCH block, and the PBCH is an abbreviation of a physical broadcast channel (physical broadcast channel). The SSB includes at least one of a primary synchronization signal (PSS), a secondary synchronization signal (SSS), and the PBCH.

In an optional example, one SSB occupies four consecutive orthogonal frequency division multiplexing (OFDM) symbols, an SSB burst set is a time window with duration of 5 ms, and a maximum of L SSBs can be transmitted in the SSB time window of 5 ms. For different frequency bands, a value of L is as follows:

(1) When a frequency band is less than 3 GHz, L=4;

(2) when a frequency band is between 3 GHz and 6 GHz, L=8; and (3) when a frequency band is between 6 GHz and 52.6 GHz, L=64.

The SSB supports subcarrier spacings of 15 kHz, 30 kHz, 120 kHz, and 240 kHz. For different subcarrier spacings, in one SSB burst set, five different mapping patterns are configured for the SSBs in time domain.

The foregoing example of the SSB is merely an example for description. The SSB in this application may alternatively have another definition.

Optionally, determining the link failure of the first control resource set based on the link failure detection mode includes:

determining the link failure of the first control resource set when the signal quality of the first reference signal is less than or equal to the first threshold and when the signal quality of the second reference signal is less than or equal to the first threshold; or determining the link failure of the first control resource set when the signal quality of the second reference signal is less than or equal to the first threshold.

It should be noted that the foregoing method is equivalent to the following several description manners.

Description Manner 1:

The link failure of the first control resource set is determined when the search space set associated with the first control resource set is the non-broadcast search space set and when the signal quality of each first reference signal is less than or equal to the first threshold, and/or when the signal quality of the second reference signal is less than or equal to the first threshold, where the second reference signal is used to indicate the reception parameter associated with the first control resource set, and the first reference signal is used for link failure detection of a control resource set other than the first control resource set.

Description Manner 2:

The link failure of the first control resource set is determined when the search space set associated with the first control resource set is the non-broadcast search space set and when the signal quality of each first reference signal is less than or equal to the first threshold, and/or when the signal quality of the second reference signal is less than or equal to the first threshold, where the second reference signal is used to indicate the reception parameter associated with the first control resource set, and the first reference signal resource set is used for link failure detection of the control resource set configured by the non-MIB information.

Description Manner 3:

The link failure of the first control resource set is determined when the search space set associated with the first control resource set is the non-broadcast search space set and when the signal quality of each first reference signal is less than or equal to the first threshold, and/or when the signal quality of the second reference signal is less than or equal to the first threshold, where the second reference signal is used to indicate the reception parameter associated with the first control resource set, and the first reference signal is used for link failure detection of a control resource set configured by RRC signaling.

In this application, the first reference signals may also be referred to as the first reference signal resource set, and the second reference signals may also be referred to as the second reference signal resource set.

There may be one or more first reference signals, and there may also be one or more second reference signals. The first reference signal is a reference signal that is preconfigured by the network device and that is used to detect whether the link failure occurs on the communication link of the first control resource set. The second reference signal is, for example, the synchronization signal/physical broadcast channel block (SSB). The terminal device may detect whether the signal quality (for example, the signal to noise ratio) of the first reference signal and the signal quality of the second reference signal are less than or equal to the first threshold. When both the signal quality of the first reference signal and the signal quality of the second reference signal are less than or equal to the first threshold, the terminal device determines that the link failure occurs on the communication link of the first control resource set. That "both the signal quality of the first reference signal and the signal quality of the second reference signal are less than or equal to the first threshold" includes: The signal quality of at least one or all of the first reference signals is less than or equal to the first threshold, and the signal quality of at least one or all of the second reference signals is less than or equal to the first threshold. According to the method, a specific reference signal does not need to be selected for detection. The method is easy to implement and has better compatibility. The compatibility means that a link failure recovery procedure of another CORESET (a CORESET other than the CORESET 0) may be directly reused in the method, including reusing procedures of sending a link failure recovery request and receiving a link failure recovery request response for the another CORESET.

Alternatively, the terminal device may detect only whether the signal quality (for example, the signal to noise ratio) of the second reference signal is less than or equal to the first threshold. When the signal quality of the second reference signal is less than or equal to the first threshold, the terminal device determines that the link failure occurs on the communication link of the first control resource set. That "the signal quality of the second reference signal is less than or equal to the first threshold" includes: The signal quality of at least one or all of the second reference signals is less than or equal to the first threshold. The first reference signal does not need to be detected. Therefore, load of determining the link failure on the communication link of the first control resource set by the terminal device is reduced.

Optionally, determining the link failure of the first control resource set based on the link failure detection mode includes:

determining the link failure of the first control resource set when the signal quality of the first reference signal is less than or equal to the first threshold in a reporting periodicity and when the signal quality of the second reference signal is less than or equal to the first threshold in the reporting periodicity; or determining the link failure of the first control resource set when the signal quality of the second reference signal is less than or equal to the first threshold in a reporting periodicity.

The reporting periodicity is a periodicity for reporting a link failure instance by a physical (PHY) layer to a media access control (MAC) layer.

Figure 5:
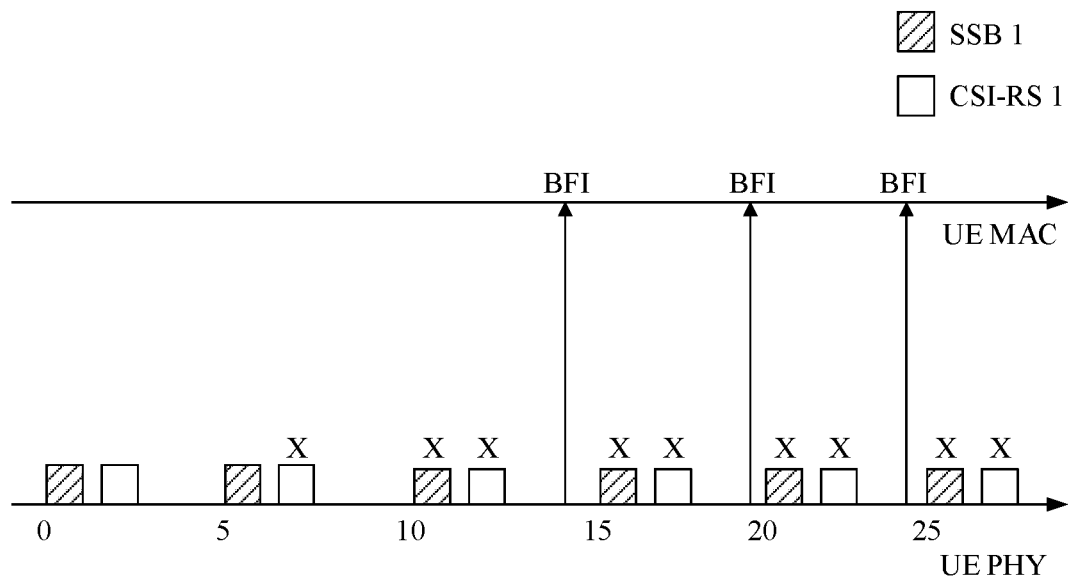
FIG. 5 shows a method for determining a link failure of a first control resource set based on a reporting periodicity according to this application.

FIG. 5 shows a method for determining the link failure of the first control resource set based on the reporting periodicity according to this application.

In FIG. 5, q0 is the reference signal resource set used for link failure detection of the first control resource set. It is assumed that reference signals in q0 include a CSI-RS 1 (namely, the first reference signal whose periodicity is 5 ms) and an SSB 1 (namely, the second reference signal whose periodicity is 5 ms). A beam failure instance (BFI) indication interval is 5 ms. The base station may configure that the communication link failure of the CORESET 0 (namely, the first control resource set) is determined when a beam failure instance occurs for a plurality of consecutive times (for example, three times), where the communication link failure of the CORESET 0 is reported by the physical layer (PHY) of the UE to the media access control (MAC) layer. It can be learned from FIG. 5 that the BFI occurs for three consecutive times in 10 ms to 25 ms, and both the signal quality of the first reference signal and the signal quality of the second reference signal are less than the first threshold in each BFI interval. In this case, the terminal device determines the link failure of the first control resource set based on the three times of BFIs. A mark "X" in the figure indicates that the signal quality of the reference signal is less than the first threshold.

Figure 6:
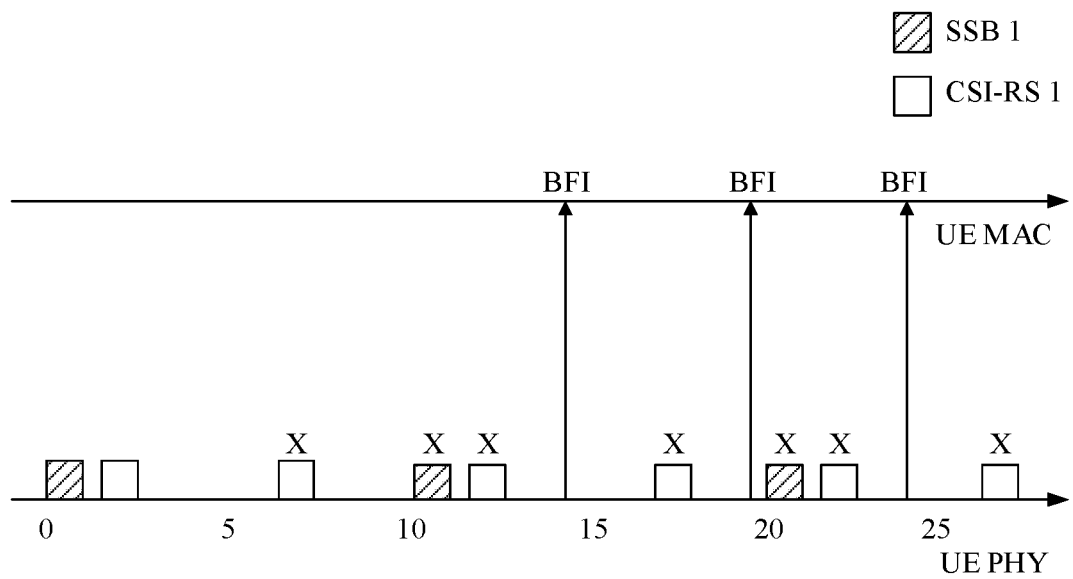
FIG. 6 shows another method for determining a link failure of a first control resource set based on a reporting periodicity according to this application.

FIG. 6 shows another method for determining the link failure of the first control resource set based on the reporting periodicity according to this application.

In FIG. 6, q0 is the reference signal resource set used for link failure detection of the first control resource set. It is assumed that reference signals in q0 include a CSI-RS 1 (namely, the first reference signal whose periodicity is 5 ms) and an SSB 1 (namely, the second reference signal whose periodicity is 10 ms). A BFI indication interval is 5 ms. The base station may configure that the communication link failure of the CORESET 0 (namely, the first control resource set) is determined when a beam failure instance occurs for a plurality of consecutive times (for example, three times), where the communication link failure of the CORESET 0 is reported by the physical layer (PHY) of the UE to the MAC layer. It can be learned from FIG. 6 that the BFI occurs for three consecutive times in 10 ms to 25 ms, and both the signal quality of the first reference signal and the signal quality of the second reference signal are less than the first threshold in each BFI interval. In this case, the terminal device determines the link failure of the first control resource set based on the three times of BFIs. A mark "X" in the figure indicates that the signal quality of the reference signal is less than the first threshold.

Figure 7:
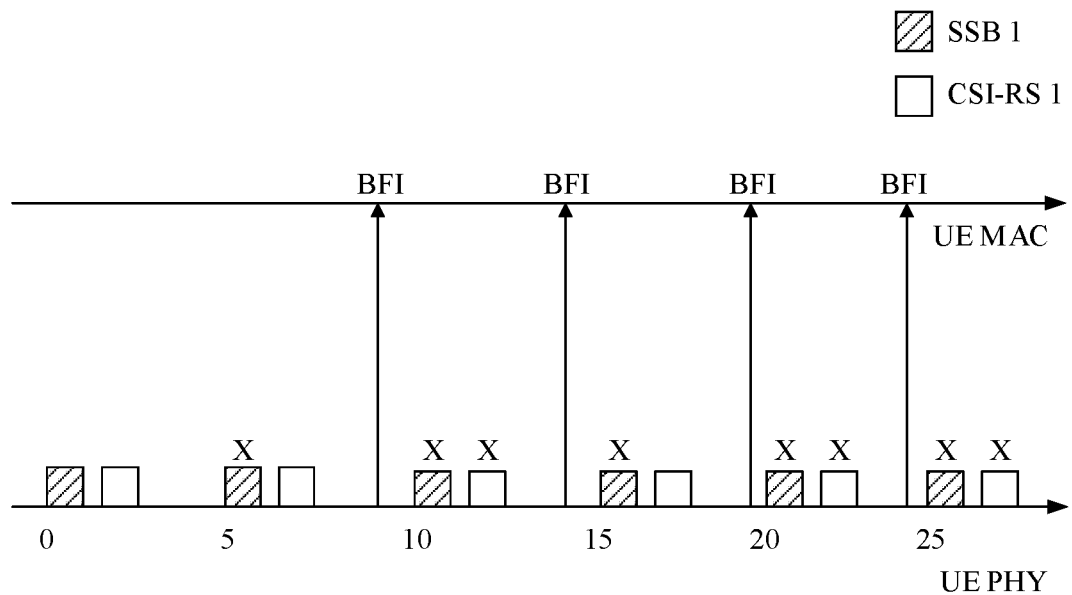
FIG. 7 shows still another method for determining a link failure of a first control resource set based on a reporting periodicity according to this application.

FIG. 7 shows still another method for determining the link failure of the first control resource set based on the reporting periodicity according to this application.

In FIG. 7, q0 is the reference signal resource set used for link failure detection of the first control resource set. It is assumed that reference signals in q0 include a CSI-RS 1 (namely, the first reference signal whose periodicity is 5 ms) and an SSB 1 (namely, the second reference signal whose periodicity is 5 ms). A beam failure instance (BFI) indication interval is 5 ms. The base station may configure that the communication link failure of the CORESET 0 (namely, the first control resource set) is determined when a beam failure instance occurs for a plurality of consecutive times (for example, three times), where the communication link failure of the CORESET 0 is reported by the physical layer (PHY) of the UE to the media access control (MAC) layer. It can be learned from FIG. 7 that the BFI occurs for three times in 10 ms to 25 ms, and both the signal quality of the first reference signal and the signal quality of the second reference signal are less than the first threshold in each BFI interval. In this case, the terminal device determines the link failure of the first control resource set based on the three times of BFIs. A mark "X" in the figure indicates that the signal quality of the reference signal is less than the first threshold.

It should be noted that, in FIG. 7, the physical layer of the terminal device determines, based on a result of measurement on a previous SSB 1, whether to report the BFI. To be specific, if signal quality of the SSB 1 measured by the terminal device in 0 ms to 5 ms is greater than the first threshold, the physical layer of the terminal device does not send the BFI in the reporting periodicity from 5 ms to 10 ms. Optionally, the terminal device may alternatively determine, based on a result of measurement on a current SSB 1, whether to report the BFI. For example, when signal quality of the SSB 1 measured by the terminal device in the periodicity from 5 ms to 10 ms is less than the first threshold, the physical layer of the terminal device immediately reports the BFI.

Figure 8:
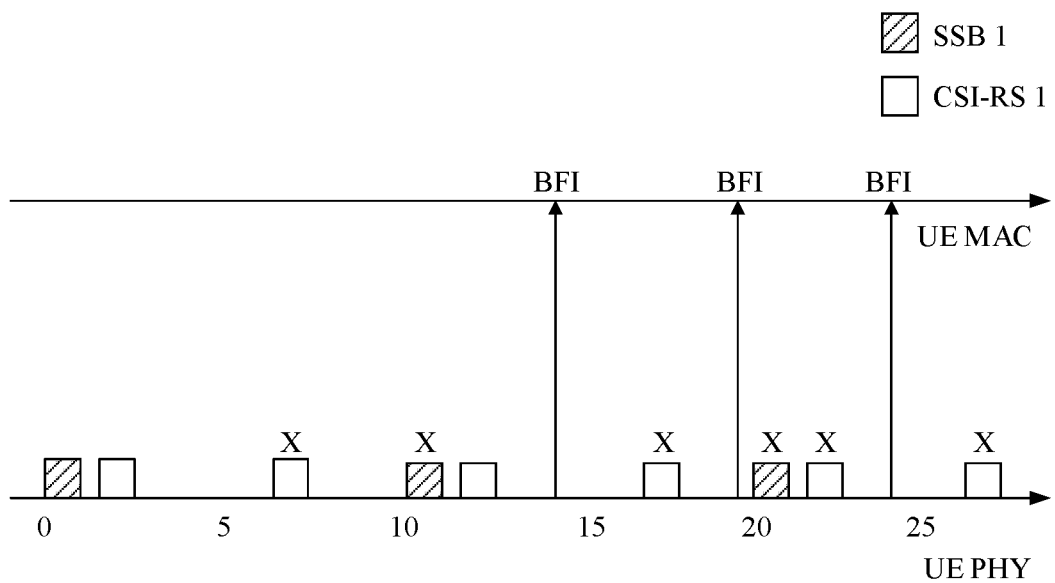
FIG. 8 shows still another method for determining a link failure of a first control resource set based on a reporting periodicity according to this application.

FIG. 8 shows still another method for determining the link failure of the first control resource set based on the reporting periodicity according to this application.

In FIG. 8, q0 is the reference signal resource set used for link failure detection of the first control resource set. It is assumed that reference signals in q0 include a CSI-RS 1 (namely, the first reference signal whose periodicity is 5 ms) and an SSB 1 (namely, the second reference signal whose periodicity is 10 ms). A beam failure instance (BFI) indication interval is 5 ms. The base station may configure that the communication link failure of the CORESET 0 (namely, the first control resource set) is determined when a beam failure instance occurs once on the SSB 1, where the communication link failure of the CORESET 0 is reported by the physical layer (PHY) of the UE to the media access control (MAC) layer. It can be learned from FIG. 8 that the BFI occurs for three times in 10 ms to 25 ms, and both the signal quality of the first reference signal and the signal quality of the second reference signal are less than the first threshold in each BFI interval. In this case, the terminal device determines the link failure of the first control resource set based on the three times of BFIs. A mark "X" in the figure indicates that the signal quality of the reference signal is less than the first threshold.

In the foregoing method, the MAC layer collects statistics about the link failure instance (that is, the BFI) of the first control resource set for a plurality of times, to reduce a probability of false determining caused by an accidental event. This improves reliability of determining the link failure of the first control resource set. In addition, the MAC layer determines one or more PRACHs used to send the link failure recovery request. This can improve air interface usage.

Optionally, when the search space set includes the non-broadcast search space (where the search space set is not limited to including only the non-broadcast search space, and may further include a broadcast search space), a reference signal resource set used for link failure detection of the first control resource set includes only a second reference signal, and the second reference signal is used to indicate a reception parameter associated with the first control resource set.

Optionally, in this application, the non-broadcast PDCCH search space set includes a type 1 common search space, and the type 1 common search space corresponds to a DCI format scrambled by at least one of the following information: RA-RNTI, TC-RNTI, or C-RNTI on a primary cell (Type1-PDCCH common search space (CSS) for a DCI format with CRC scrambled by a RA-RNTI, or a TC-RNTI, or a C-RNTI on a primary cell).

Optionally, in this application, the non-broadcast PDCCH search space set further includes a type 3 common search space, and the type 3 common search space corresponds to a DCI format scrambled by at least one of the following information: INT-RNTI, SFI-RNTI, TPC-PUSCH-RNTI, TPC-PUCCH-RNTI, TPC-SRS-RNTI, C-RNTI, CS-RNTI, and SP-CSI-RNTI. (a Type3-PDCCH common search space for a DCI format with CRC scrambled by INT-RNTI, or SFI-RNTI, or TPC-PUSCH-RNTI, or TPC-PUCCH-RNTI, or TPC-SRS-RNTI, or C-RNTI, or CS-RNTI, or SP-CSI-RNTI).

Optionally, in this application, the non-broadcast PDCCH search space set further has the following characteristic: A DCI format carried by a non-broadcast PDCCH includes a DCI format 2_0, and/or a DCI format 2_1, and/or a DCI format 2_2, and/or a DCI format 2_3; and the terminal device detects the DCI format 2_0 with a CRC scrambled by SFI-RNTI (UE detects the DCI format 2_0 with CRC scrambled by SFI-RNTI);

the terminal device detects the DCI format 2_1 with a CRC scrambled by INT-RNTI (UE detects the DCI format 2_1 with CRC scrambled by INT-RNTI);

the terminal device detects the DCI format 2_2 with a CRC scrambled by TPC-PUSCH-RNTI or TPC-PUCCH-RNTI (UE detects the DCI format 2_2 with CRC scrambled by TPC-PUSCH-RNTI or TPC-PUCCH-RNTI); and the terminal device detects the DCI format 2_3 with a CRC scrambled by TPC-SRS-RNTI (UE detects the DCI format 2_3 with CRC scrambled by TPC-SRS-RNTI).

Optionally, determining the link failure of the first control resource set based on the link failure detection mode includes: determining the link failure of the first control resource set when signal quality of the second reference signal is less than or equal to the first threshold.

The network device may configure only the second reference signal in the reference signal resource set for link failure detection of the first control resource set. There may be one or more second reference signals. The terminal device detects the second reference signal (for example, an SSB). When the signal quality of the second reference signal is less than or equal to the first threshold, the terminal device determines the link failure of the first control resource set. Alternatively, when the signal quality of the second reference signal is less than or equal to the first threshold for several consecutive times, the terminal device determines the link failure of the first control resource set. That "the signal quality of the second reference signal is less than or equal to the first threshold" may be that signal quality of at least one second reference signal is less than or equal to the first threshold, or signal quality of each second reference signal is less than or equal to the first threshold. A function of determining whether the signal quality of the second reference signal is less than or equal to the first threshold for several consecutive times may be implemented at a physical layer of the terminal device. The first control resource set (for example, the CORESET 0) is used to receive a system message, and the system message is usually an important message. In the method, the communication link of the first control resource set can be quickly recovered while compatibility is maintained.

In this application, the first reference signal and the second reference signal may be configured in the following four optional manners:

Optional manner 1: The first reference signal is configured by higher layer signaling (for example, RRC or a MAC control element (CE)), and the second reference signal is a reference signal in a TCI configured for the first control resource set.

Optional manner 2: The first reference signal is configured by higher layer signaling (for example, RRC or a MAC CE), and the second reference signal is an SSB that is associated with the corresponding first control resource set and that is used to receive the second message in the initial access phase, an SSB used to receive the fourth message in the initial access phase, or an SSB reported during last BFR.

Optional manner 3: The first reference signal is a reference signal in a TCI configured for the control resource set configured by the non-MIB information, and the second reference signal is a reference signal in a TCI configured for the first control resource set.

Optional manner 4: The first reference signal is a reference signal in a TCI configured for the control resource set configured by the non-MIB information, and the second reference signal is an SSB used by the terminal device to receive the second message, where the second message is carried on the first control resource set, and the first control resource set is used to send a random access response message; the second reference signal is an SSB used by the terminal device to receive the fourth message, where the fourth message is carried on the first control resource set, and the first control resource set is used to send a random access response message; the second reference signal is a reference signal that has a QCL assumption relationship with a DMRS of the first control resource set, where the first control resource set is used to carry the second message, and the second message is a random access response message; the second reference signal is a reference signal that has a QCL assumption relationship with a DMRS of a physical downlink shared channel PDSCH, where the PDSCH is used to carry the fourth message, and the fourth message is a contention resolution message sent by the network device to the terminal device; the second reference signal is an SSB reported during previous BFR; or the second reference signal is a reference signal that has a QCL assumption relationship with a DMRS of a control resource set for sending link failure recovery request response information.

Optionally, determining the link failure of the first control resource set based on the link failure detection mode includes:

determining the link failure of the first control resource set when the signal quality of the second reference signal is less than or equal to the first threshold in a reporting periodicity, where the reporting periodicity is a periodicity for reporting a link failure instance by a physical (PHY) layer to a MAC layer.

In the foregoing method, the MAC layer collects statistics about the link failure instance (that is, the BFI) of the first control resource set for a plurality of times, to reduce a probability of false determining caused by an accidental event. This improves reliability of determining the link failure of the first control resource set. In addition, the MAC layer determines one or more PRACHs used to send the link failure recovery request. This can improve air interface usage.

Optionally, determining the link failure of the first control resource set based on the link failure detection mode includes:

determining the link failure of the first control resource set when the search space is the non-broadcast search space and when the signal quality of the second reference signal is less than or equal to the first threshold, where the second reference signal is used to indicate the reception parameter associated with the first control resource set.

In the foregoing method, whether the signal quality of the second reference signal (for example, the SSB) is less than or equal to the first threshold is directly detected, to determine whether the link failure occurs on the communication link of the first control resource set. The first reference signal is not added to the first reference signal set. This improves link recovery efficiency of the first control resource set.

Figure 9:
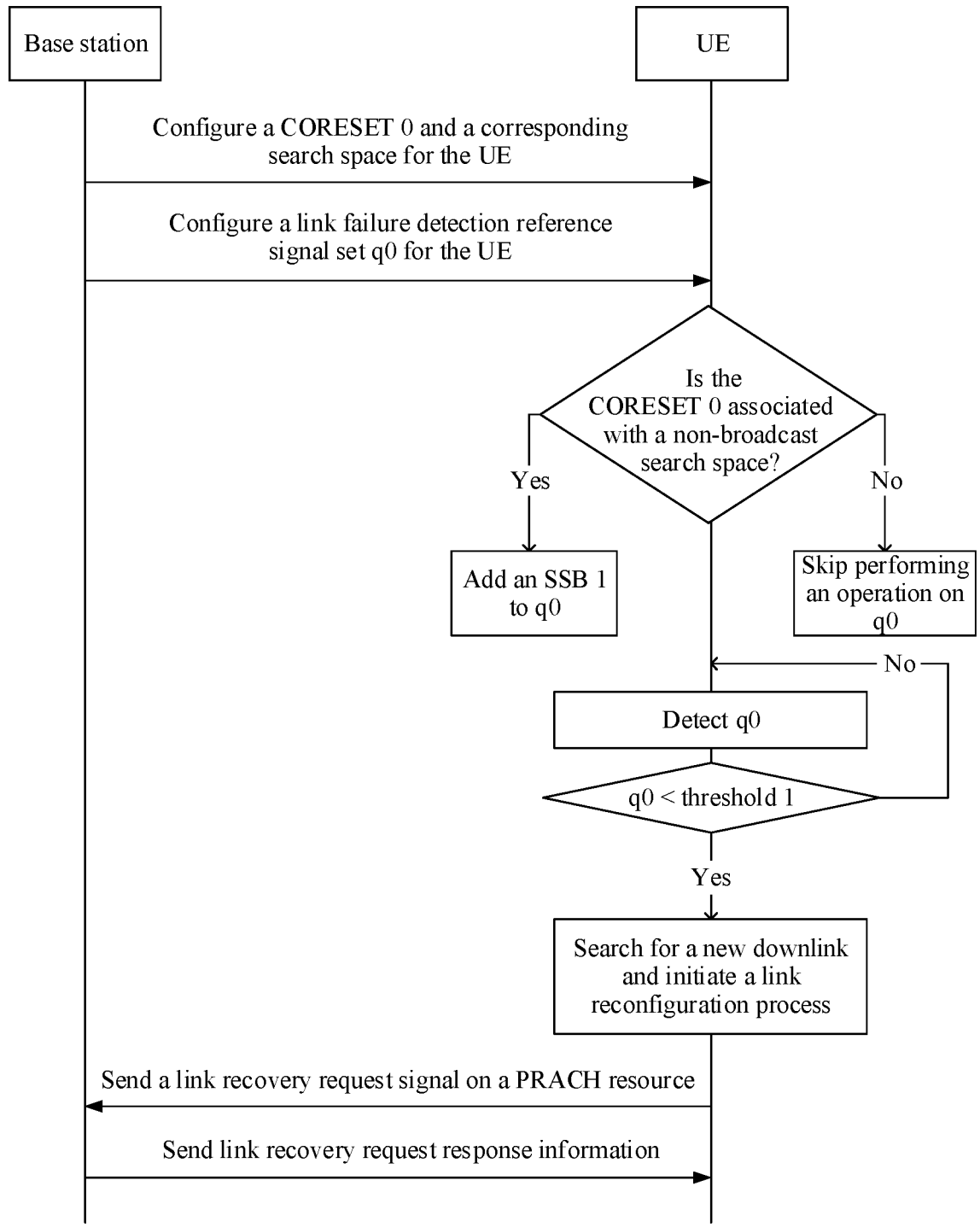
FIG. 9 is a schematic flowchart of a method for detecting a CORESET 0 according to this application.

FIG. 9 is a schematic flowchart of a method for detecting the CORESET 0 according to this application.

First, the base station configures, for the UE, the CORESET 0, the corresponding search space, and a reference signal resource set q0 used for link failure detection (where the reference signal configuration may be indicated in an explicit or implicit manner, the explicit manner means that q0 is directly configured, and the implicit manner means that a reference signal indicating a TCI (for example, a type D QCL) corresponding to a CORESET is used as a reference signal in q0). q0 refers to the reference signal resource set that is described in the claims and is used for link failure detection of the control resource set other than the first control resource set.

The UE determines that a search space set configured for the CORESET 0 includes a non-broadcast search space set, and the UE adds an RS (that is, an SSB) associated with the CORESET 0 to q0, and determines link failures of the CORESET 0 and other CORESETs together.

If the search space set configured for the CORESET 0 does not include the non-broadcast search space set, the UE does not add the RS associated with the CORESET 0 to q0.

The UE determines, through measurement, whether channel quality of all RSs in q0 is less than a preset threshold, that is, whether "q0<threshold 1" shown in FIG. 9.

After determining that the link failure occurs on the communication link of the CORESET 0, the UE initiates a link failure recovery procedure, including: searching for a new downlink and initiating a link reconfiguration process, sending a link recovery request through a PRACH, and receiving a link recovery request response message.

Figure 10:
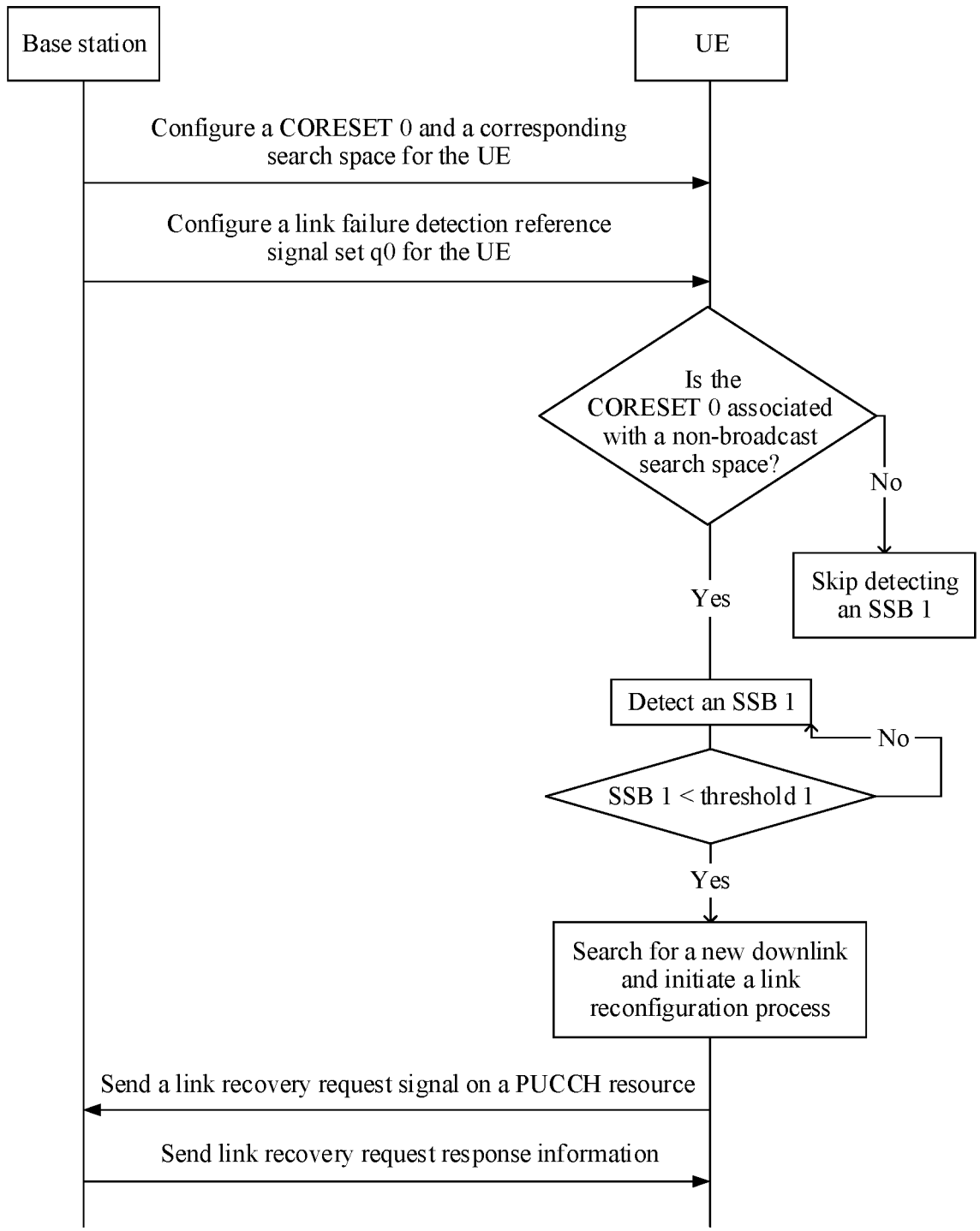
FIG. 10 is a schematic flowchart of another method for detecting a CORESET 0 according to this application.

FIG. 10 is a schematic flowchart of another method for detecting the CORESET 0 according to this application.

First, the base station configures, for the UE, the CORESET 0, the corresponding search space, and a reference signal resource set q0 used for link failure detection (where the reference signal configuration may be indicated in an explicit or implicit manner, the explicit manner means that q0 is directly configured, and the implicit manner means that a reference signal indicating a TCI (for example, a type D QCL) corresponding to a CORESET is used as a reference signal in q0).

The UE determines that the search space configured for the CORESET 0 includes a non-broadcast search space, and the UE detects channel quality of an RS (that is, an SSB 1) associated with the CORESET 0; otherwise, the UE does not detect the SSB 1.

The UE determines, through measurement, whether channel quality of all RSs in q0 is less than a preset threshold, that is, whether "SSB 1<threshold 1" shown in FIG. 10.

After determining that a link failure occurs on a communication link of the CORESET 0, the UE initiates a link failure recovery procedure, including: searching for a new downlink and initiating a link reconfiguration process, sending a link recovery request through a PRACH, and receiving a link recovery request response message.

If the UE determines (at a physical layer) that the channel quality of the SSB associated with the CORESET 0 is less than the preset threshold for K consecutive times, the UE sends the link failure recovery request of the CORESET 0 through a PUCCH.

If the UE determines that the channel quality of q0 is less than the preset threshold for K consecutive times, the UE sends a link failure recovery request of a CORESET other than the CORESET 0 through the PRACH.

The method 300 further includes the following steps.

S320: Determine a new candidate link. For example, the UE measures channel quality of a reference signal in a candidate beam identifier reference signal set (candidate beam identification RS set), to obtain a reference signal (new identified beam) whose channel quality is greater than a preset threshold.

Determining a new link or a new beam described in this application means that the terminal device needs to select, from a candidate reference signal resource set, a reference signal resource whose channel quality information (such as RSPR, RSRQ, a CQI, a BLER, an SINR, and an SNR) is greater than the preset threshold, to recover the communication link. It should be noted that an execution sequence of the two steps in which the terminal device detects the link failure and the terminal device determines the new link is not limited. A time at which the terminal device detects the link failure may be earlier than a time at which the terminal device identifies the new beam, a time at which the terminal device detects the link failure may be later than a time at which the terminal device identifies the new beam, or a time at which the terminal device detects the link failure may be the same as a time at which the terminal device determines the new link.

S330: Send the link failure recovery request, which may also be referred to as a beam failure recovery request (beam failure recovery request transmission). For example, the UE sends the link failure recovery request information to the base station, where the link failure recovery request information has an association relationship with the reference signal whose channel quality is greater than the preset threshold and that is determined in S320, and the UE may notify the base station of the newly identified beam or reference signal resource in an explicit or implicit manner.

The link failure recovery request sent by the terminal device to the network device is used to initiate link reconfiguration. In other words, the link failure recovery request is used to indicate the link failure or communication failure.

Herein, the terminal device identifies the downlink beam with good quality, where the downlink beam includes a transmit beam of the base station and/or a receive beam of the terminal device.

In a scenario of beam reciprocity, there is a correspondence between the receive beam of the terminal device and a transmit beam of the terminal device. In this case, the terminal device may send the link reconfiguration request through the newly identified receive beam of the terminal device. In a scenario without beam reciprocity, the terminal device needs to send the link reconfiguration request information through another transmit beam.

In the scenario of beam reciprocity, each receive beam of the terminal device corresponds to one transmit beam of the terminal device. Herein, the receive beam of the terminal device corresponding to the transmit beam of the terminal device means that the receive beam of the terminal device and the transmit beam of the terminal device have same directivity. Optionally, the receive beam of the terminal device and the corresponding transmit beam of the terminal device may be a same beam, and the receive beam and the transmit beam may belong to a same transceiver apparatus. Optionally, an antenna port corresponding to the receive beam of the terminal device and an antenna port corresponding to the corresponding transmit beam of the terminal device may be quasi co-located (QCL). Optionally, being quasi co-located means that the antenna ports have at least one same parameter in the following parameters or have a determined correspondence in terms of at least one of the following parameters: an angle of arrival (AoA), a dominant angle of arrival (Dominant AoA), an average angle of arrival, a power angular spectrum of an angle of arrival (power angular spectrum (PAS) of AoA), an angle of departure (AoD), a dominant angle of departure, an average angle of departure, a power angular spectrum of an angle of departure, terminal device transmit beamforming, terminal device receive beamforming, a spatial channel correlation, base station transmit beamforming, base station receive beamforming, an average channel gain, an average channel delay, a delay spread, a Doppler spread, a spatial reception parameter (spatial Rx parameters), and the like.

S320 and S330 may include the following optional implementations.

Optionally, S320 includes:

determining a third reference signal (namely, the new candidate link described in S320) based on the reference signal resource set used for link failure detection of the first control resource set, where the third reference signal is a reference signal whose signal quality is greater than or equal to a second threshold in the reference signal resource set used for link failure detection of the first control resource set, and the reference signal in the reference signal resource set used for link failure detection of the first control resource set is a synchronization signal and/or a broadcast channel reference signal.

Optionally, S330 includes:

sending the link failure recovery request, where the link failure recovery request is used to request to recover the communication link of the first control resource set based on the third reference signal.

The third reference signal set is, for example, an SSB set, and an SSB in the SSB set are, for example, a PSS, a PBCH, or a DMRS in one synchronization broadcast channel block. The second threshold may be configured by the network device, or may be predefined. The second threshold may be the same as or different from the first threshold. The terminal device may detect the SSBs in the SSB set, to determine an SSB (namely, the third reference signal) whose signal quality is greater than or equal to the second threshold, so as to further request the network device to recover the communication link of the first control resource set based on the second reference signal. In the foregoing method, the second reference signal is directly determined, and there is no other intermediate process. This improves link recovery efficiency of the first control resource set.

Figure 11:
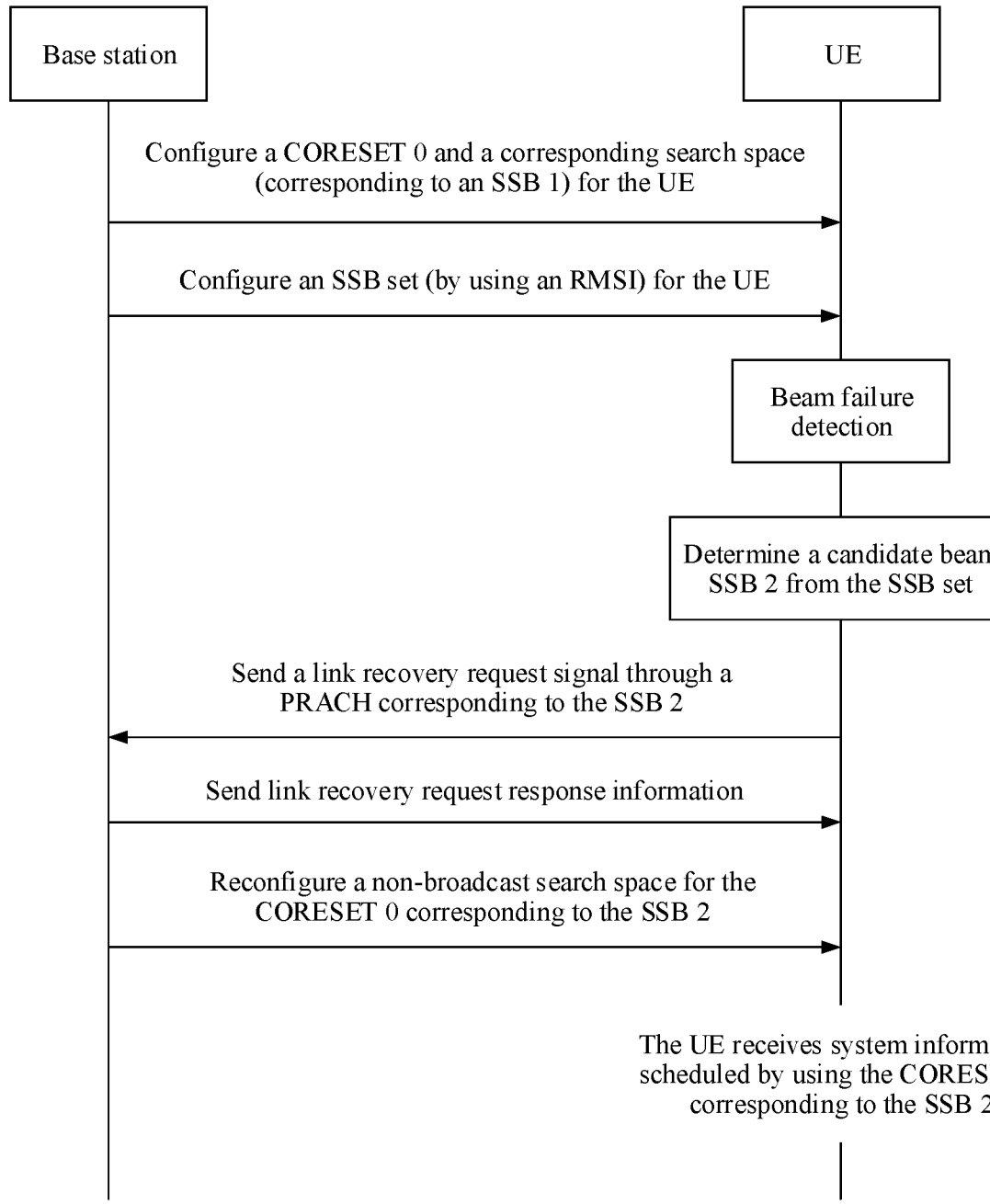
FIG. 11 is a flowchart of sending a link failure recovery request according to this application.

FIG. 11 is a flowchart of sending the link failure recovery request according to this application.

First, the base station configures the CORESET 0 and the corresponding search space for the UE. The CORESET 0 corresponds to an SSB 1.

The UE finds that a beam of the CORESET 0 fails, and finds, from SSBs configured by the base station (configured by the base station by using an RMSI), an SSB 2 whose signal quality is greater than a preset threshold. One SSB corresponds to one CORESET 0, and different SSBs may correspond to a same CORESET 0 or different CORESETs 0.

The UE reports information about the SSB 2 to the base station in the following manner:

explicitly notifying the base station of a beam index, that is, an index of the SSB 2; or selecting a PRACH associated with the SSB 2 to report the link failure recovery request, so that the network device knows which downlink is available.

Optionally, the base station may simultaneously send a link failure recovery request response and reconfigure a non-broadcast search space for the CORESET.

The base station directly associates the non-broadcast search space with the CORESET 0 corresponding to the SSB 2. Optionally, the base station does not need to notify the UE of this operation because the UE has reported the information about the SSB 2 to the base station and the base station and the UE have reached an agreement.

Optionally, if the UE detects DCI in the CORESET 0 corresponding to the SSB 2, the UE considers that the link failure recovery request response is received.

Optionally, S320 includes:

determining a third reference signal based on a fourth reference signal associated with a second control resource set, where the second control resource set is one of a plurality of control resource sets configured before determining the link failure of the first control resource set, quality of a reference signal corresponding to the second control resource set is greater than or equal to a second threshold, the fourth reference signal and the third reference signal satisfy a QCL assumption relationship, and the fourth reference signal is used to indicate a reception parameter associated with the second control resource set.

Optionally, S330 includes:

sending the link failure recovery request, where the link failure recovery request is used to request to recover the communication link of the first control resource set based on the third reference signal.

The fourth reference signal is, for example, a channel state information reference signal (CSI-RS), or may be another reference signal (for example, a TRS). The terminal device may determine the third reference signal based on the CSI-RS and the QCL assumption relationship, where the third reference signal and the CSI-RS satisfy the QCL assumption relationship. In the method, signal quality of a configured SSB does not need to be detected, and the third reference signal is directly determined by using a TCI corresponding to a CORESET on which no link failure occurs. This improves link recovery efficiency of the first control resource set.

Figure 12:
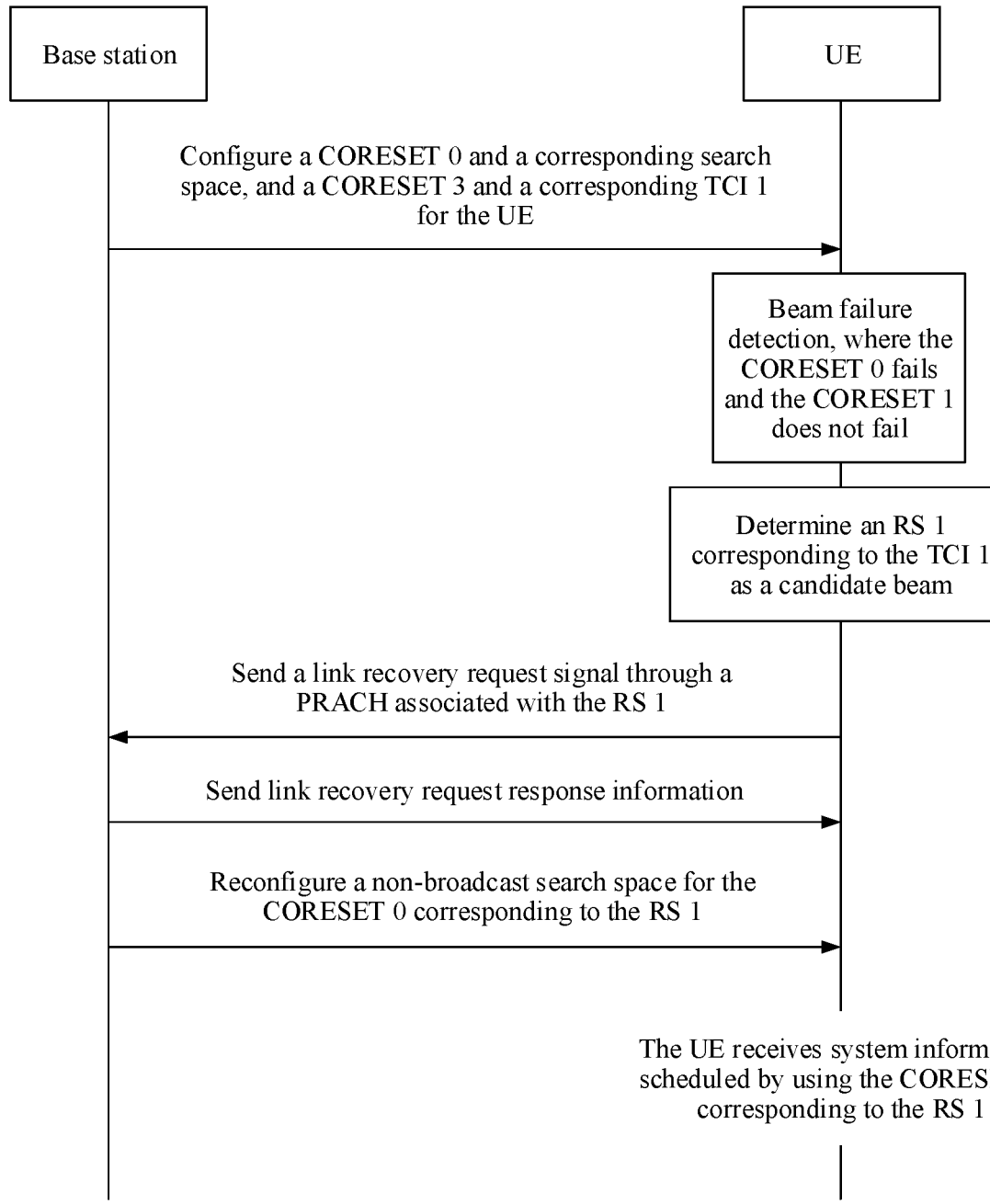
FIG. 12 is a flowchart of sending a link failure recovery request according to this application.

FIG. 12 is a flowchart of sending the link failure recovery request according to this application.

First, the base station configures the CORESET 0 and the corresponding search space for the UE. The CORESET 0 corresponds to an SSB 1.

The UE finds a beam failure of the CORESET 0. No beam failure occurs on a CORESET 3, a TCI of the CORESET 3 indicates that the CORESET 3 is associated with a CSI-RS (for example, a QCL type D RS), and the CSI-RS 1 and an SSB 2 satisfy a QCL relationship.

Alternatively, the UE finds a beam failure of the CORESET 0. No beam failure occurs on a CORESET 3, and a TCI of the CORESET 3 indicates that the CORESET 3 is associated with an SSB 2 (for example, a QCL type D RS).

The UE reports information about the SSB 2 to the base station. A method for reporting the information of the SSB 2 to the base station includes:

notifying, by using explicit information (for example, information carried on a PUCCH/PUSCH), the base station of a beam index selected by the UE, where the beam index is an index of the SSB 2; or selecting a PRACH associated with the SSB 2 to report the link failure recovery request, so that the UE knows which PRACH is available.

Optionally, the base station may simultaneously send a link failure recovery request response and reconfigure a non-broadcast search space for the CORESET.

The base station directly associates the non-broadcast search space with the CORESET 0 corresponding to the SSB 2. Optionally, the base station does not need to notify the UE of this operation because the UE has reported the information about the SSB 2 to the base station and the base station and the UE have reached an agreement.

Optionally, if the UE detects DCI in the CORESET 0 corresponding to the SSB 2, the UE considers that the link failure recovery request response is received.

Optionally, S330 includes:

sending the link failure recovery request through a PUCCH, where the PUCCH is used to carry channel quality information and/or scheduling request information.

The terminal device may reuse the PUCCH carrying the channel quality information and/or the scheduling request information, to send the link failure recovery request. For example, a special status bit of a field of a beam report is used to distinguish whether sent information is a beam report or a link failure recovery request. The special status bit is, for example, a reserved bit in absolute or reference 7 bits. This improves utilization of air interface resources.

For example, the link failure recovery request is sent on the PUCCH (by reusing a PUCCH resource carrying CSI used for beam management BM). Optionally, whether normal beam relationship information or the link failure recovery request of the CORESET 0 is reported is distinguished by using a special status bit of the channel quality information used to report beam management information. Alternatively, whether the normal beam relationship information or the link failure recovery request of the CORESET 0 is reported is distinguished by using a DMRS sequence cyclic shift of the PUCCH.

The terminal device may alternatively send the link failure recovery request in the following manners.

Manner 1: Send the link failure recovery request information on a contention-based PRACH resource.

Manner 2: Send the link failure recovery request information on a non-contention-based PRACH resource.

Manner 3: Send the link failure recovery request information on a physical uplink shared channel (PUSCH).

The terminal device may reuse the PUCCH carrying the channel quality information and/or the scheduling request information, to send the link failure recovery request. For example, a special status bit of a field of a beam report is used to distinguish whether sent information is a beam report or a link failure recovery request. The special status bit is, for example, a reserved bit, a least significant bit, or a most significant bit in absolute or reference 7 bits. This improves utilization of air interface resources.

Optionally, the channel quality information is reporting information used for beam management (reporting of beam management information), including reference signal received power (RSRP) related information, or channel quality indicator (CQI) related information used for link adaptation.

The reference signal received power related information includes at least one of RSRP, a reference signal resource index (such as a CSI-RS resource indicator (CRI), or an SSB resource indicator (SSBRI)), and reference signal received quality (RSRQ). The channel quality indicator related information includes at least one of a reference signal resource index (such as a CRI), a precoding matrix indicator (PMI), a rank indicator (RI), a channel quality indicator (CQI), and a layer indicator (LI).

The scheduling request information includes the following two cases. In one case, 1 bit is used to indicate whether to request data scheduling. In other words, two states (the 1 bit has two states "0" and "1") are used to indicate whether to request data scheduling. In the other case, whether there is a sequence (on/off) is used to indicate whether to request data scheduling. If there is data scheduling, the sequence is sent. If there is no data scheduling, the sequence is not sent.

Optionally, S330 includes:

sending the link failure recovery request through a PRACH, where the PRACH has an association relationship with the third reference signal, and the second reference signal is the reference signal for recovering the communication link of the first control resource set.

The foregoing association relationship means that the network device configures the third reference signal on the PRACH resource by using the RRC signaling. When uplink and downlink beams have reciprocity, the terminal device may send the link failure request through a beam corresponding to the third reference signal. The PRACH may be a PRACH configured in a contention-based random access scenario (namely, a contention-based PRACH resource), or may be a PRACH configured in a non-contention-based random access scenario (namely, a non-contention-based PRACH resource). When the contention-based PRACH resource is used, because the contention-based PRACH resource is used for initial access, reusing the PRACH resource can reduce overheads. If the non-contention-based PRACH resource is used, the network device configures the PRACH resource for the terminal device separately. Because the terminal device does not need to contend with another user, a time for sending the link failure recovery request can be reduced.

Optionally, the CRC of downlink control information (DCI) detected in the non-broadcast search space in the non-broadcast search space set in this application is scrambled by at least one of the following information:

random access RNTI (RA-RNTI), temporary cell RNTI (TC-RNTI), cell RNTI (C-RNTI), interruption RNTI (INT-RNTI), slot format indication RNTI (SFI-RNTI), transmit power control physical uplink shared channel RNTI (TPC-PUSCH-RNTI), transmit power control physical uplink control channel RNTI (TPC-PUCCH-RNTI), transmit power control sounding reference symbols RNTI (TPC-SRS-RNTI), configured scheduling RNTI (CS-RNTI), and semi-persistent channel state information RNTI (SP-CSI-RNTI).

The UE may reuse the PUCCH/PUSCH/PRACH to send the link failure recovery request information of the CORESET 0. For example, the UE reuses the PUCCH for sending the beam report, to send the link failure recovery request. If reporting is performed in a non-differential manner, whether the sent information is the beam report or the link failure recovery request of the CORESET 0 is distinguished by using the status bit of the reserved bit in the 7 bits of absolute RSRP. For example, if all reserved bits in the 7 bits are set to 1, it indicates that the reported information is the beam report; or if all reserved bits in the 7 bits are set to 0, it indicates that the reported information is the link failure recovery request of the CORESET 0.

The method 300 further includes the following step.

S340: The terminal device detects a CORESET and receives a beam failure recovery request response sent by the base station (UE detects CORESET to receive gNB response for beam failure recovery request). The beam failure recovery request response may also be referred to as a link failure recovery request response, or may have another name. Optionally, the CORESET is a dedicated CORESET configured by the base station for the UE, and is used to transmit, after the UE sends the link failure request, the link failure request response sent by the base station. The UE may simultaneously detect the CORESET and receive the beam failure recovery request, or may sequentially perform the two steps. A sequence of the two steps is not limited. Optionally, the UE sends the link failure request, and four slots later, receives the link failure recovery request response information in a link failure recovery request response time window.

In the foregoing step, the beam failure request may alternatively have another name, for example, a beam failure recovery request, a link reconfiguration request, a communication link fault recovery request, a communication link failure recovery request, a beam fault recovery request, a link failure recovery request, a communication fault recovery request, a communication failure recovery request, a reconfiguration request, a link recovery request, a link fault recovery request, a communication link recovery request, or the like.

In S340, the terminal device detecting the CORESET may include:

detecting, on a fifth control resource set, the non-broadcast search space set associated with the first control resource set (including all or a part of non-broadcast search space sets associated with the first control resource set), where the fifth control resource set is a control resource set configured after determining the link failure of the first control resource set.

The fifth control resource set is a control resource set newly configured after the link failure of the first control resource set occurs, or the fifth control resource set is the first control resource set for which a QCL/TCI is reconfigured. According to the method, the network device may find a downlink with relatively good channel quality from a plurality of downlinks reported by the terminal device, and configure the downlink for the terminal device. The terminal device may detect, on the new control resource set that has relatively good performance and that is configured by the network device, the search space set associated with the first control resource set. This improves receiving performance. Optionally, the search space set that is associated with the first control resource set and that is detected on the fifth control resource set includes a search space set scrambled by SFI-RNTI and/or INT-RNTI.

Optionally, the terminal device detecting the CORESET may further include:

detecting, on a third control resource set, the search space associated with the first control resource set, where the third control resource set is a control resource set associated with the third reference signal, and the third control resource set is a control resource set configured by a second MIB.

The second MIB may be the same as or different from the first MIB. The link recovery request including the third reference signal implicitly indicates a parameter (namely, the reception parameter indicated by the third reference signal) used by the terminal device to detect the non-broadcast search space, and the network device does not need to reconfigure the non-broadcast search space of the first control resource set. This reduces signaling overheads and improves link recovery efficiency of the first control resource set.

Optionally, the terminal device detecting the CORESET may further include:

detecting, on the second control resource set, the non-broadcast search space set associated with the first control resource set, where the second control resource set is one of the plurality of control resource sets configured before determining the link failure of the first control resource set, and the quality of the reference signal corresponding to the second control resource set is greater than or equal to the second threshold.

The second control resource set may be, for example, a control resource set configured by RRC signaling. When the control resource set configured by the RRC signaling is available, the terminal device may detect the non-broadcast search space on the control resource set configured by the RRC signaling. In this way, the network device does not need to reconfigure the non-broadcast search space of the first control resource set by using additional signaling. This reduces signaling overheads and improves link recovery efficiency of the first control resource set.

Figure 13:
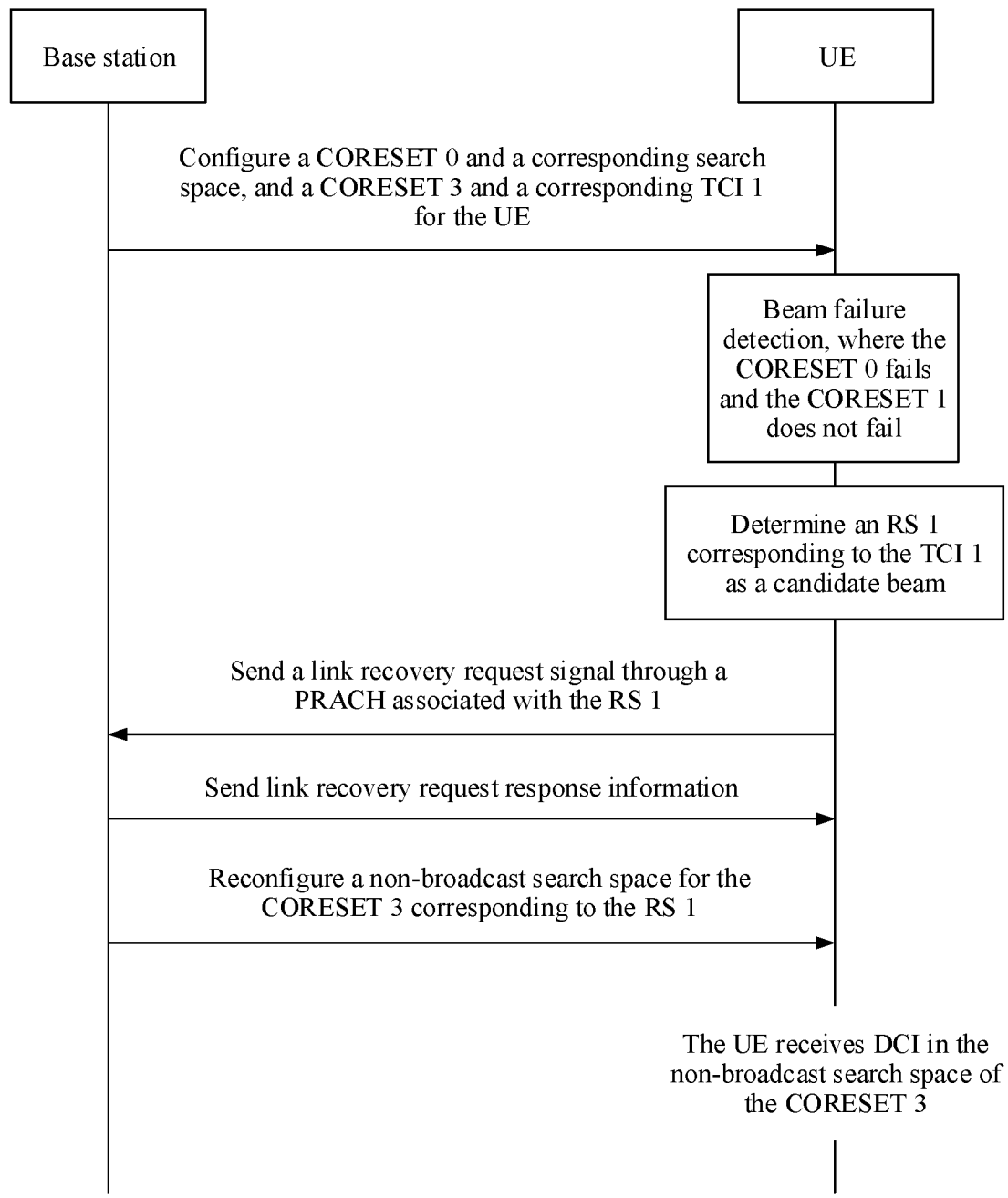
FIG. 13 is a flowchart of a method for detecting a non-broadcast search space according to this application.

FIG. 13 is a flowchart of a method for detecting the DCI in the non-broadcast search space according to this application.

First, the base station configures the CORESET 0 and the corresponding search space for the UE. The CORESET 0 corresponds to an SSB 1.

The UE finds a beam failure of the CORESET 0, and no beam failure occurs on a CORESET 3.

The UE reports the beam failure of the CORESET 0 to the base station. In addition, the UE may further report available information of the CORESET 3 to the base station. For example, the UE reports an index of a beam or TCI corresponding to the CORESET 3, and the UE notifies the base station of an index of a failed beam through explicit information on an uplink resource (for example, a PUCCH).

Optionally, the base station may simultaneously send the link failure recovery request response and reconfigure the non-broadcast search space for the CORESET 3.

As shown in FIG. 13, the base station directly associates the non-broadcast search space with the CORESET 3 without the beam failure. Optionally, the base station does not need to notify the UE of this operation because the UE has reported the index of the beam or TCI corresponding to the CORESET 3 to the base station and the base station and the UE have reached an agreement.

Optionally, if the UE detects, in the CORESET 3, the DCI corresponding to the non-broadcast search space, the UE considers that the link failure recovery request response is received.

Optionally, the UE detecting the CORESET may further include:

receiving the link failure recovery request response on a fourth control resource set; and/or detecting, on the fourth control resource set, the non-broadcast search space set associated with the first control resource set, where the fourth control resource set is a control resource set specifically used for receiving the link failure recovery request response.

The fourth control resource set is a control resource set specially configured for recovering the communication link. In other words, the fourth control resource set is a control resource set that is configured before the link failure occurs and that is specifically used for link failure recovery. The terminal device may determine, based on a control resource set used for receiving information, or a search space set associated with the control resource set, whether the received information is a normal data scheduling response or the link failure recovery request response. After determining the link failure of the first control resource set, the network device returns the communication failure recovery request response to the terminal device by using the fourth control resource set, and a DMRS of the fourth control resource set and the reference signal that is used to recover the link and that is included in the link failure recovery request satisfy a QCL relationship. The terminal device may detect, based on the control resource set (namely, the fourth control resource set) configured by the network device, the non-broadcast search space set associated with the first control resource set, so that the terminal device can still receive an important system message in the link failure recovery process. According to the method, before the new control resource set being configured by the network device, the terminal device may detect in the search space set associated with the first control resource set in advance, to receive related information. This improves link recovery efficiency of the first control resource set.

Figure 14:
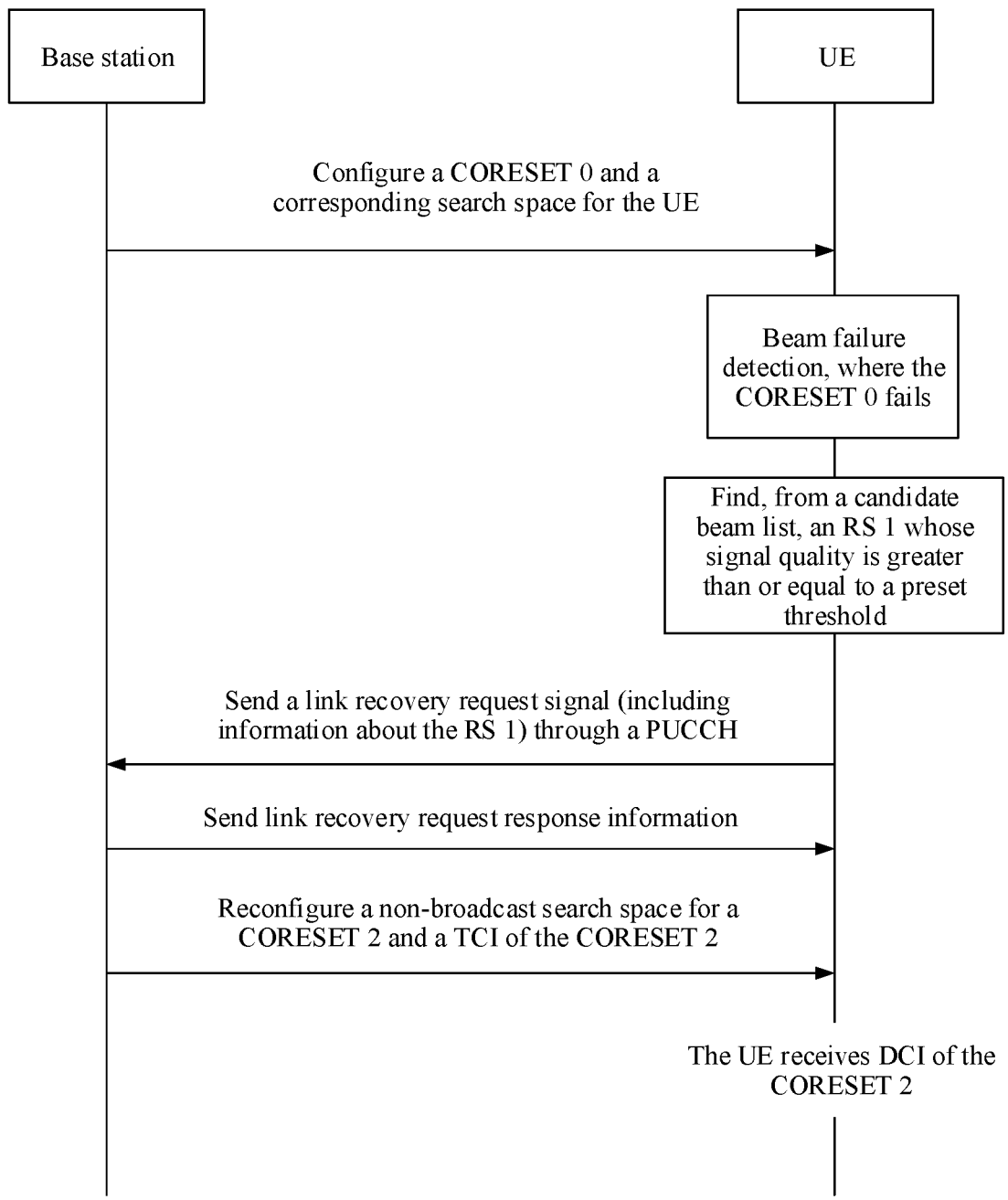
FIG. 14 is a flowchart of another method for detecting a non-broadcast search space according to this application.

FIG. 14 is a flowchart of another method for detecting the DCI in the non-broadcast search space according to this application.

First, the base station configures the CORESET 0 and the corresponding broadcast search space and non-broadcast search space for the UE. The CORESET 0 corresponds to an SSB 1.

The UE finds that a beam failure occurs on the CORESET 0, and searches a candidate beam list configured by the base station for a reference signal (which is referred to as a new beam for short for ease of description) whose channel quality is greater than a preset threshold.

The UE reports the beam failure of the CORESET 0 to the base station, for example, notifies the base station of an index of a failed beam of the CORESET 0 and/or an index of the new beam through explicit information carried on a PUCCH.

The base station may simultaneously send the link failure recovery request response and reconfigure the non-broadcast search space for a CORESET 2.

The UE detects, in the CORESET 2, the DCI corresponding to the non-broadcast search space.

The foregoing describes the link recovery method provided in this application from a perspective of the terminal device. The following describes the link recovery method provided in this application from a perspective of the network device.

Figures 15, 16:
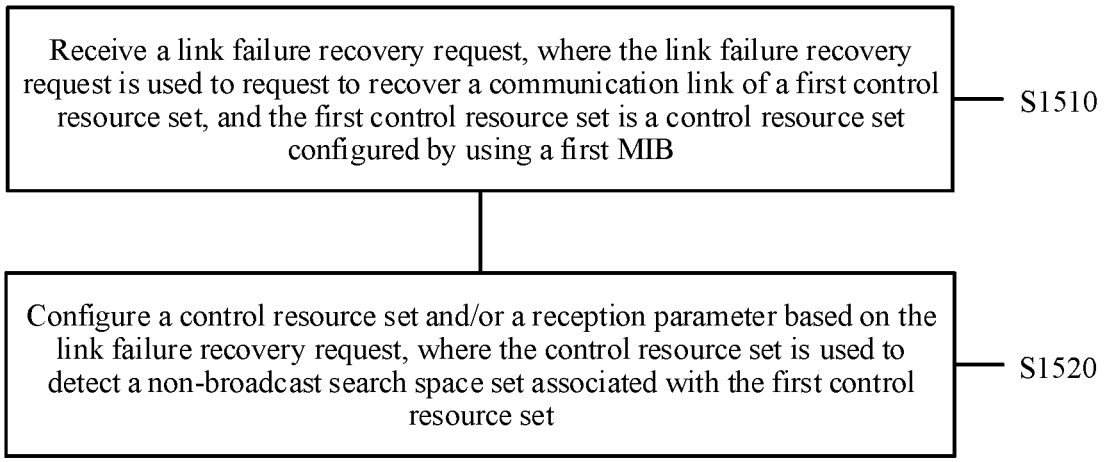
FIG. 15 is a schematic flowchart of still another link recovery method according to this application.
FIG. 16 is a schematic structural diagram of a link recovery apparatus according to this application.

As shown in FIG. 15, this application further provides a link recovery method 1500. The method 1500 may be performed by a network device, and includes the following steps.

S1510: Receive a link failure recovery request, where the link failure recovery request is used to request to recover a communication link of a first control resource set, and the first control resource set is a control resource set configured by a first MIB.

S1520: Configure a control resource set and/or a reception parameter based on the link failure recovery request, where the control resource set is used to detect in a non-broadcast search space set associated with the first control resource set.

The first control resource set may be a CORESET, a control region, or an ePDCCH set defined in a 5G mobile communications system, or may be a resource set that is defined in another mobile communications system (for example, a sixth-generation mobile communications system) and that carries a PDCCH. When a network device learns that a link failure occurs on the communication link of the first control resource set, the network device may configure the control resource set and/or the reception parameter, to quickly recover the communication link of the control resource set configured by the MIB.

It may be clearly understood by a person skilled in the art that, in the method 1500, both the network device and a terminal device may be equivalent to the network device and the terminal device in the method 300, and actions of the network device and the terminal device in the method 1500 correspond to actions of the network device and the terminal device in the method 300. For brevity, details are not described herein again.

Optionally, the control resource set is one of a plurality of control resource sets configured before receiving the link failure recovery request, and quality of a reference signal corresponding to the control resource set is greater than or equal to a first threshold and/or a second threshold.

The control resource set may be, for example, a control resource set configured by RRC signaling. When the control resource set configured by the RRC signaling is available, the terminal device may detect in a non-broadcast search space on the control resource set configured by the RRC signaling. In this way, the network device does not need to reconfigure the non-broadcast search space of the first control resource set by using additional signaling. This reduces signaling overheads and improves link recovery efficiency of the first control resource set.

Optionally, the control resource set is a control resource set configured after receiving the link failure recovery request.

The control resource set is, for example, the fifth control resource set described in the method, and the fifth control resource set is a control resource set newly configured after the link failure of the first control resource set occurs, or the fifth control resource set is the first control resource set for which a QCL/TCI is reconfigured. According to the method, the network device may find a downlink with relatively good channel quality from a plurality of downlinks reported by the terminal device, and configure the downlink for the terminal device. The terminal device may detect, on the new control resource set that has relatively good performance and that is configured by the network device, the search space set associated with the first control resource set. This improves system performance.

Optionally, S1510 includes:

receiving the link failure recovery request including a third reference signal, where the third reference signal is a reference signal for recovering the communication link of the first control resource set; and configuring the control resource set and/or the reception parameter based on the link failure recovery request includes: configuring, based on the link failure recovery request, the control resource set and/or the reception parameter that are/is associated with the third reference signal.

The third reference signal is, for example, an SSB used to indicate a reception parameter associated with a second control resource set (namely, a control resource set for detecting the non-broadcast search space set associated with the first control resource set). The network device recovers the communication link of the first control resource set based on the SSB, and does not need to reconfigure the non-broadcast search space of the first control resource set by using additional signaling. This reduces signaling overheads and improves link recovery efficiency of the first control resource set.

Optionally, S1510 includes:

receiving the link failure recovery request through a PUCCH, where the PUCCH is used to carry channel quality information and/or scheduling request information.

The network device may reuse the PUCCH carrying the channel quality information and/or the scheduling request information, to receive the link failure recovery request. For example, a special status bit of a field of a beam report is used to distinguish whether sent information is a beam report or a link failure recovery request. The special status bit is, for example, a reserved bit, a least significant bit, or a most significant bit in absolute or reference 7 bits. This improves utilization of air interface resources.

Optionally, S1510 includes:

receiving the link failure recovery request through a PRACH, where the PRACH has an association relationship with the third reference signal, and the third reference signal is the reference signal for recovering the communication link of the first control resource set.

The foregoing association relationship means that the network device configures the third reference signal in a PRACH resource by using RRC signaling. When uplink and downlink beams have reciprocity, the terminal device may send the link failure request through a beam corresponding to the third reference signal. The PRACH may be a PRACH configured in a contention-based random access scenario (namely, a contention-based PRACH resource), or may be a PRACH configured in a non-contention-based random access scenario (namely, a non-contention-based PRACH resource). When the contention-based PRACH resource is used, because the contention-based PRACH resource is used for initial access, reusing the PRACH resource can reduce overheads. If the non-contention-based PRACH resource is used, the network device configures the PRACH resource for the terminal device separately. Because the terminal device does not need to contend with another user, a time for sending the link failure recovery request can be reduced.

Optionally, the method 1500 further includes:

sending a link failure recovery request response on the control resource set, and/or sending, on the control resource set, the non-broadcast search space set associated with the first control resource set.

The control resource set may be the second control resource set or a third control resource set. When the control resource set is the second control resource set, the second control resource set may be, for example, a control resource set configured by radio resource control (RRC) signaling. When the control resource set configured by the RRC signaling is available, the terminal device may detect the non-broadcast search space on the control resource set configured by the RRC signaling. In this way, the network device does not need to reconfigure the non-broadcast search space of the first control resource set by using additional signaling. This reduces signaling overheads and improves link recovery efficiency of the first control resource set. When the control resource set is the third control resource set, the network device may directly send the link failure recovery request response by using the third control resource set, or may not send the link failure recovery request response, but sends DCI by using the third control resource set. When the terminal device detects, on the third control resource set, the search space associated with the first control resource set, and obtains the DCI, the terminal device may determine that the link failure recovery request response is received (where the DCI is equivalent to the link failure recovery request response). Alternatively, the network device may send the DCI by using the third control resource set after sending the link failure recovery request response. In the foregoing method, the link recovery request including the third reference signal implicitly indicates a parameter (namely, the reception parameter indicated by the third reference signal) used by the terminal device to detect the non-broadcast search space, and the network device does not need to reconfigure the non-broadcast search space of the first control resource set. This reduces signaling overheads and improves link recovery efficiency of the first control resource set.

Optionally, the method 1500 further includes:

sending a link failure recovery request response on a fourth control resource set, and/or sending, on the fourth control resource set, the non-broadcast search space set associated with the first control resource set, where the fourth control resource set is a control resource set specifically used for sending the link failure recovery request response.

The fourth control resource set is a control resource set specially configured by the network device for recovering the communication link. In other words, the fourth control resource set is a control resource set that is configured before the link failure occurs and that is specifically used for link failure recovery. The terminal device may determine, based on a control resource set used for receiving information, or a search space set associated with the control resource set, whether the received information is a normal data scheduling response or the link failure recovery request response. After determining the link failure of the first control resource set, the network device returns the communication failure recovery response information to the terminal device by using the fourth control resource set. A DMRS of the fourth control resource set and the reference signal that is used to recover the link and that is included in the link failure recovery request satisfy a QCL relationship. The terminal device may detect, based on the control resource set (namely, the fourth control resource set) reconfigured by the network device, the non-broadcast search space set associated with the first control resource set. According to the method, before the new control resource set being configured by the network device, the terminal device may detect in the search space set associated with the first control resource set in advance, to receive related information. This improves link recovery efficiency of the first control resource set.

Optionally, a DCI format of the non-broadcast search space set includes a DCI format 2_0 and/or a DCI format 2_1; or a cyclic redundancy check CRC of DCI detected in the non-broadcast search space set is scrambled by slot format indication radio network temporary identifier SFI-RNTI and/or interruption radio network temporary identifier INT-RNTI.

The cyclic redundancy check (CRC) of the DCI detected in the non-broadcast search space set is scrambled by slot format indication radio network temporary identifier (SFI-RNTI) and/or interruption radio network temporary identifier (INT-RNTI), and the CRC of the DCI is a CRC generated by using an information bit of the DCI.

A CRC of the DCI format 2_0 is scrambled by SFI-RNTI, and is mainly used to send a slot format. A CRC of the DCI format 2_1 is scrambled by INT-RNTI, and is mainly used to notify the terminal device of a location of rate-matching (a puncturing location during transmission of ultra-reliable low-latency communication (URLLC) service data). The information is used for data demodulation and reference signal receiving or sending. Therefore, associating the fourth control resource with a corresponding search space can ensure that the important information used to indicate the slot format or pre-emption information can also be received in the link failure recovery process, to correctly receive data and a reference signal.

Optionally, the method 1500 further includes:

sending, on a fifth control resource set, the non-broadcast search space set associated with the first control resource set, where the fifth control resource set is a control resource set configured after determining the link failure of the first control resource set.

The fifth control resource set is a control resource set newly configured after the link failure of the first control resource set occurs, or the fifth control resource set is the first control resource set for which a QCL/TCI is reconfigured. According to the method, the network device may find a downlink with relatively good channel quality from a plurality of downlinks reported by the terminal device, and configure the downlink for the terminal device. The terminal device may detect, on the new control resource set that has relatively good performance and that is configured by the network device, the search space set associated with the first control resource set. This improves receiving performance. Optionally, the search space set that is associated with the first control resource set and that is detected on the fifth control resource set includes a search space set scrambled by SFI-RNTI and/or INT-RNTI.

The foregoing describes in detail examples of the link recovery method provided in this application. It may be understood that, to implement the foregoing functions, the terminal device and the network device each include a corresponding hardware structure and/or software module for performing each function. A person skilled in the art should be easily aware that, units and algorithm steps in the examples described with reference to the embodiments disclosed in this specification may be implemented in a form of hardware or in a form of a combination of hardware and computer software in this application. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of this application.

FIG. 16 is a schematic structural diagram of a link recovery apparatus according to this application. The apparatus 1600 includes:

a processing unit 1610, configured to determine a link failure of a first control resource set, where the first control resource set is a control resource set configured by a first MIB; and a sending unit 1620, configured to send a link failure recovery request, where the link failure recovery request is used to request to recover a communication link of the first control resource set.

The apparatus 1600 may be a communications device (for example, a terminal device), or may be a chip in a communications device. The apparatus may include a processing unit and a transceiver unit. When the apparatus is a communications device, the processing unit may be a processor, and the transceiver unit may be a transceiver. The communications device may further include a storage unit, and the storage unit may be a memory. The storage unit is configured to store an instruction, and the processing unit executes the instruction stored in the storage unit, to enable the communications device to perform the method 300. When the apparatus is a chip in a communications device, the processing unit may be a processor, and the transceiver unit may be an input/output interface, a pin, a circuit, or the like. The processing unit executes an instruction stored in a storage unit, to enable the communications device to perform the method. The storage unit may be a storage unit (for example, a register or a cache) in the chip, or may be a storage unit (for example, a read-only memory or a random access memory) that is inside the communications device and that is located outside the chip.

It may be clearly understood by a person skilled in the art that, when the apparatus 1600 is the terminal device, for steps performed by the apparatus 1600 and corresponding beneficial effects, refer to related descriptions of the terminal device in the method 300. For brevity, details are not described herein again.

Figure 17:
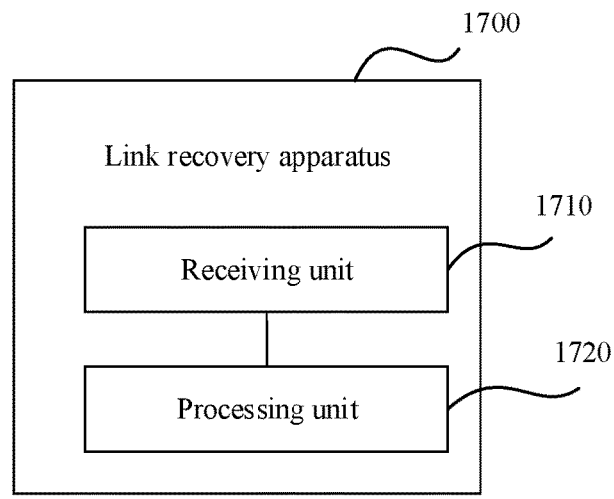
FIG. 17 is a schematic structural diagram of another link recovery apparatus according to this application.

FIG. 17 is a schematic structural diagram of another link recovery apparatus according to this application. The apparatus 1700 includes:

a receiving unit 1710, configured to receive a link failure recovery request, where the link failure recovery request is used to request to recover a communication link of a first control resource set, and the first control resource set is a control resource set configured by a first master information block MIB; and a processing unit 1720, configured to configure a control resource set and/or a reception parameter based on the link failure recovery request, where the control resource set is used to detect in a non-broadcast search space set associated with the first control resource set.

The apparatus 1700 may be a communications device (for example, a network device), or may be a chip in a communications device. The apparatus may include a processing unit and a transceiver unit. When the apparatus is a communications device, the processing unit may be a processor, and the transceiver unit may be a transceiver. The communications device may further include a storage unit, and the storage unit may be a memory. The storage unit is configured to store an instruction, and the processing unit executes the instruction stored in the storage unit, to enable the communications device to perform the method. When the apparatus is a chip in a communications device, the processing unit may be a processor, and the transceiver unit may be an input/output interface, a pin, a circuit, or the like. The processing unit executes an instruction stored in a storage unit, to enable the communications device to perform the method according to the second aspect. The storage unit may be a storage unit (for example, a register or a cache) in the chip, or may be a storage unit (for example, a read-only memory or a random access memory) that is inside the communications device and that is located outside the chip.

It may be clearly understood by a person skilled in the art that, when the apparatus 1700 is the network device, for steps performed by the apparatus 1700 and corresponding beneficial effects, refer to related descriptions of the network device in the method 300 and the method 1500. For brevity, details are not described herein again.

It should be understood that division into the foregoing units is merely function division, and there may be another division method in actual implementation.

It may be clearly understood by a person skilled in the art that, for specific working processes of the apparatus and units described above and for technical effects generated by performing the steps, refer to descriptions in the foregoing method embodiments. For brevity, details are not described herein again.

The link recovery apparatus may be a chip. The processing unit may be implemented by using hardware, or may be implemented by using software. When the processing unit is implemented by using the hardware, the processing unit may be a logic circuit, an integrated circuit, or the like. When the processing unit is implemented by using the software, the processing unit may be a general-purpose processor, and is implemented by reading software code stored in a storage unit. The storage unit may be integrated into the processor, may be located outside the processor, or may exist independently.

The link recovery apparatus provided in this application is further described below by using an example in which the link recovery apparatus is a terminal device or a network device.

Figure 18:
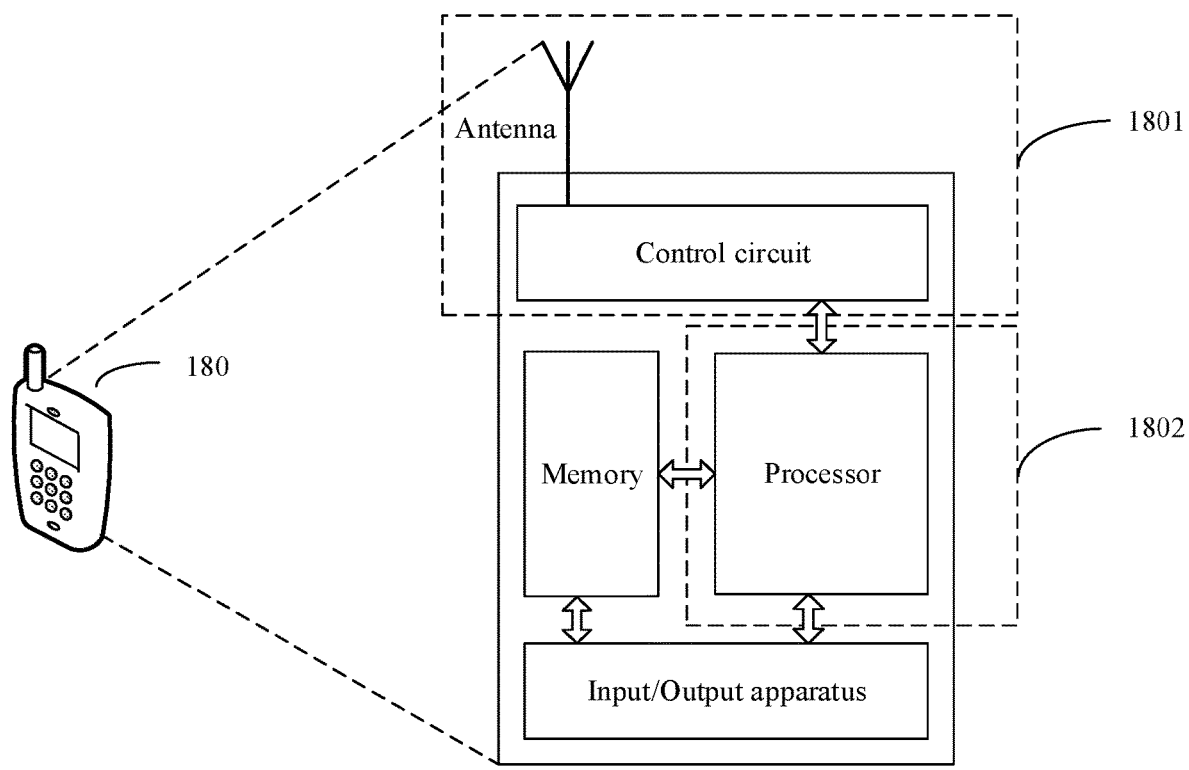
FIG. 18 is a schematic structural diagram of a terminal device according to this application.

FIG. 18 is a schematic structural diagram of a terminal device according to this application. The terminal device may be applicable to the communications system shown in FIG. 1, and perform a function of a receive end in the foregoing method embodiments. For ease of description, FIG. 18 shows only main components of the terminal device. As shown in FIG. 18, the terminal device 180 includes a processor, a memory, a control circuit, an antenna, and an input/output apparatus. The processor is mainly configured to: process a communication protocol and communication data, control the entire terminal device, execute a software program, and process data of the software program. For example, the processor is configured to support the terminal device in performing an action described in the foregoing method embodiments. The memory is mainly configured to store the software program and the data. The control circuit is mainly configured to: perform conversion between a baseband signal and a radio frequency signal, and process the radio frequency signal. A combination of the control circuit and the antenna may be referred to as a transceiver, mainly configured to send and receive a radio frequency signal in an electromagnetic wave form. The input/output apparatus, such as a touchscreen, a display screen, or a keyboard, is mainly configured to receive data input by a user and output data to the user.

After the terminal device is powered on, the processor may read the software program in a storage unit, explain and execute an instruction of the software program, and process the data of the software program. When data needs to be sent in a wireless manner, the processor performs baseband processing on the to-be-sent data, and then outputs a baseband signal to a radio frequency circuit. After performing radio frequency processing on the baseband signal, the radio frequency circuit sends a radio frequency signal to the outside through the antenna in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 18 shows only one memory and only one processor. In an actual terminal device, there may be a plurality of processors and a plurality of memories. The memory may also be referred to as a storage medium, a storage device, or the like. This is not limited in this application.

In an optional implementation, the processor may include a baseband processor and/or a central processing unit. The baseband processor is mainly configured to process the communication protocol and the communication data. The central processing unit is mainly configured to: control the entire terminal device, execute the software program, and process the data of the software program. Functions of the baseband processor and the central processing unit may be integrated into the processor in FIG. 18. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program, so that the processor executes the software program to implement a baseband processing function.

In this embodiment of this application, the control circuit and the antenna that has a transceiver function may be considered as a transceiver unit 1801 of the terminal device 180. For example, the transceiver unit 1801 is configured to support the terminal device in performing the receiving function and sending function described in the method 400. The processor having a processing function is considered as a processing unit 1802 of the terminal device 180. As shown in FIG. 18, the terminal device 180 includes the transceiver unit 1801 and the processing unit 1802. The transceiver unit may also be referred to as a transceiver, a transceiver machine, a transceiver apparatus, or the like. Optionally, a device configured to implement the receiving function in the transceiver unit 1801 may be considered as a receiving unit, and a device configured to implement the sending function in the transceiver unit 1801 may be considered as a sending unit. In other words, the transceiver unit 1801 includes the receiving unit and the sending unit. The receiving unit may also be referred to as a receiving machine, an input port, a receiving circuit, or the like. The sending unit may be referred to as a transmitting machine, a transmitter, a transmitting circuit, or the like. For example, the transceiver unit 1801 may not include an antenna, but includes only a circuit part, and the antenna is disposed outside the transceiver unit.

The processor 1802 may be configured to execute an instruction stored in the memory to control the transceiver unit 1801 to receive a signal and/or send a signal, so as to complete a function of the terminal device in the foregoing method embodiments. In an implementation, a function of the transceiver unit 1801 may be implemented by using a transceiver circuit or a transceiver-dedicated chip. When receiving and sending various types of signals, the transceiver unit 1801 is controlled by the processor 1802 to implement the receiving. Therefore, the processor 1802 is a decider of sending or receiving the signal, and initiates a data sending or receiving operation, and the transceiver unit 1801 is an executor of sending or receiving the signal.

Figure 19:
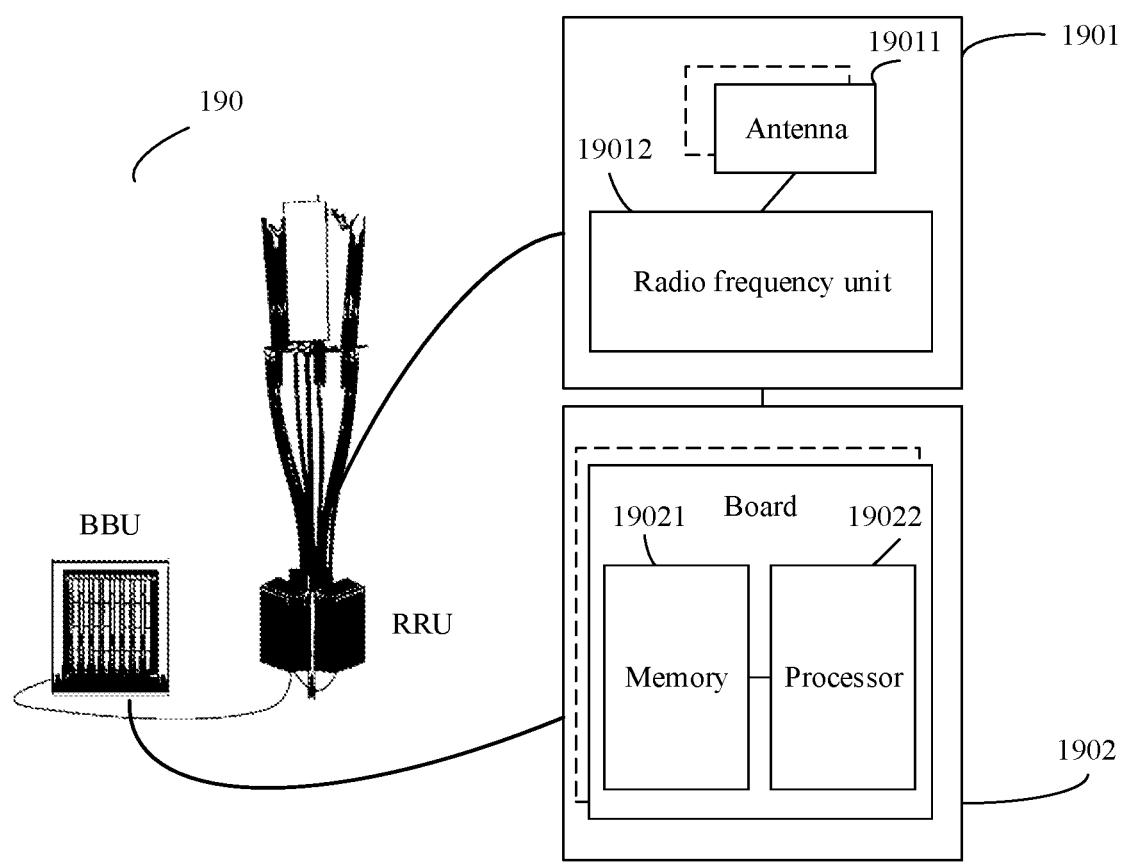
FIG. 19 is a schematic structural diagram of an access network device according to this application.

FIG. 19 is a schematic structural diagram of a network device according to an embodiment of this application. The network device may be, for example, a base station. As shown in FIG. 19, the base station may be applied to the communications system shown in FIG. 1, to perform a function of a transmit end in the foregoing method embodiments. The base station 190 may include one or more radio frequency units, such as a remote radio unit (RRU) 1901 and one or more baseband units (BBU) (which may also be referred to as digital units (DU)) 1902. The RRU 1901 may be referred to as a transceiver unit, a transceiver machine, a transceiver circuit, a transceiver, or the like, and may include at least one antenna 19011 and a radio frequency unit 19012. The RRU 1901 is mainly configured to send and receive a radio frequency signal and perform conversion between a radio frequency signal and a baseband signal. The BBU 1902 is mainly configured to: perform baseband processing, control the base station, and so on. The RRU 1901 and the BBU 1902 may be physically disposed together, or may be physically disposed separately, to be specific, may be distributed base stations.

The BBU 1902 is a control center of the base station, may also be referred to as a processing unit, and is mainly configured to complete a baseband processing function such as channel coding, multiplexing, modulation, or spreading. For example, the BBU (a processing unit) 1902 may be configured to control the base station to perform an operation procedure related to the network device in the foregoing method embodiments.

In an embodiment, the BBU 1902 may include one or more boards, and a plurality of boards may jointly support a radio access network (such as a long term evolution (LTE) network) of a single access standard, or may separately support radio access networks (for example, an LTE network, a 5G network, and another network) of different access standards. The BBU 1902 further includes a memory 19021 and a processor 19022. The memory 19021 is configured to store a necessary instruction and necessary data. The processor 19022 is configured to control the base station to perform a necessary action, for example, configured to control the base station to perform the operation procedure related to the network device in the foregoing method embodiments. The memory 19021 and the processor 19022 may serve one or more boards. In other words, a memory and a processor may be disposed on each board. Alternatively, a plurality of boards may share a same memory and a same processor. In addition, a necessary circuit may be further disposed on each board.

Figure 20:
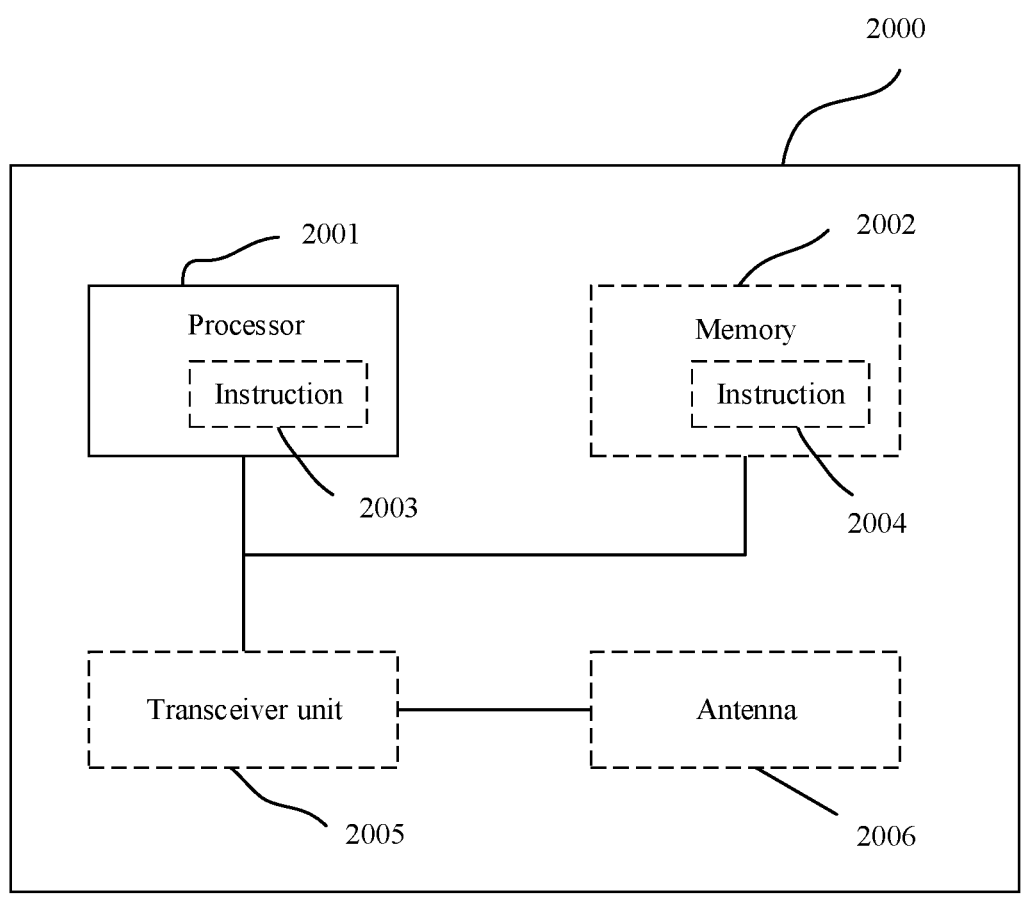
FIG. 20 is a schematic structural diagram of a communications apparatus according to this application.

FIG. 20 is a schematic structural diagram of a communications apparatus 2000. The apparatus 2000 may be configured to perform steps of the method described in the foregoing method embodiments. For details, refer to the descriptions in the foregoing method embodiments. The communications apparatus 2000 may be a chip, a network device (for example, a base station), a terminal device, another communications device, or the like.

The communications apparatus 2000 includes one or more processors 2001. The processor 2001 may be a general-purpose processor, a dedicated processor, or the like. For example, the processor 2001 may be a baseband processor or a central processing unit. The baseband processor may be configured to process a communication protocol and communication data. The central processing unit may be configured to: control the communications apparatus (for example, a base station, a terminal, or a chip), execute a software program, and process data of the software program. The communications apparatus may include a transceiver unit, configured to input (receive) and output (send) a signal. For example, the communications apparatus may be a chip, and the transceiver unit may be an input and/or output circuit or a communications interface of the chip. The chip may be applied to a terminal, a base station, or another communications device. For another example, the communications apparatus may be a terminal, a base station, or another communications device, and the transceiver unit may be a transceiver, a radio frequency chip, or the like.

Figure 4:
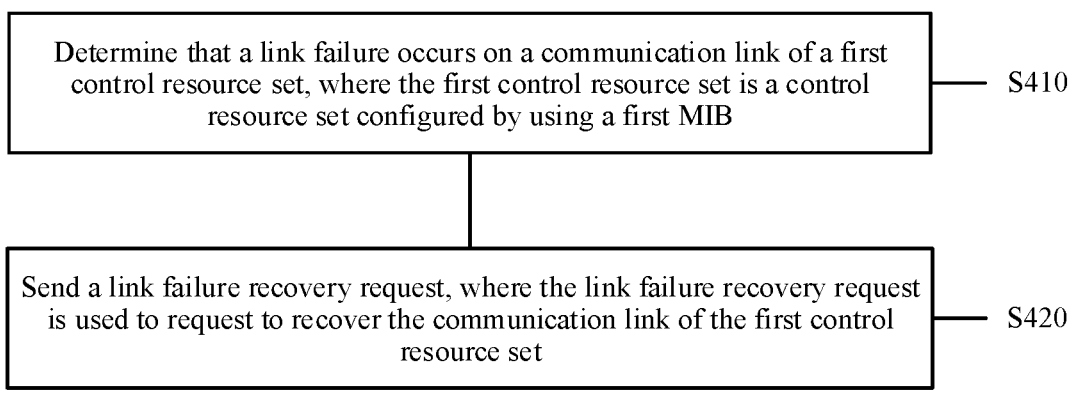
FIG. 4 is a schematic flowchart of another link recovery method according to this application.

The communications apparatus 2000 includes one or more processors 2001, and the one or more processors 2001 may implement a function of an execution device of the method in the embodiment shown in FIG. 3 and/or the method in the embodiment shown in FIG. 4.

Optionally, in addition to functions of the embodiment shown in FIG. 3 and/or the embodiment shown FIG. 4, the processor 2001 may further implement other functions.

Optionally, in a design, the processor 2001 may execute instructions, to enable the communications apparatus 2000 to perform the steps described in the foregoing method embodiments. All or a part of the instructions may be stored in the processor, for example, an instruction 2003, or all or a part of the instructions may be stored in a memory 2002 coupled to the processor, for example, an instruction 2004. Alternatively, the communications apparatus 2000 may be enabled, by using both the instructions 2003 and 2004, to perform the steps described in the foregoing method embodiments.

In another possible design, the communications apparatus 2000 may alternatively include a circuit. The circuit may implement a function of the network device or the terminal device in the foregoing method embodiments.

In another possible design, the communications apparatus 2000 may include one or more memories 2002 that store the instruction 2004. The instruction may be run on the processor, to enable the communications apparatus 2000 to perform the method described in the foregoing method embodiments. Optionally, the memory may further store data. Optionally, the processor may also store an instruction and/or data. For example, the one or more memories 2002 may store the correspondence described in the foregoing embodiments, or the related parameter or table provided in the foregoing embodiments. The processor and the memory may be disposed separately, or may be integrated together.

In another possible design, the communications apparatus 2000 may further include a transceiver unit 2005 and an antenna 2006. The processor 2001 may also be referred to as a processing unit, and controls the communications apparatus (the terminal or the base station). The transceiver unit 2005 may be referred to as a transceiver machine, a transceiver circuit, a transceiver, or the like, and is configured to implement a transceiver function of the communications apparatus through the antenna 2006.

This application further provides a communications system, including one or more foregoing network devices and one or more foregoing terminal devices.

It should be noted that, the processor in the embodiments of this application may be an integrated circuit chip, and has a signal processing capability. In an implementation process, steps in the foregoing method embodiments may be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by using a hardware decoding processor, or may be performed and completed by using a combination of hardware in a decoding processor and a software module. The software module may be located in a mature storage medium in the art, such as a random access memory, a flash memory, a read-only memory, a programmable read-only memory, an electrically erasable programmable memory, a register, or the like. The storage medium is located in a memory, and the processor reads information in the memory and completes the steps in the foregoing methods in combination with hardware of the processor.

It may be understood that the memory in the embodiments of this application may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example description but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

This application further provides a computer-readable medium. The computer-readable medium stores a computer program. When the computer program is executed by a computer, a function in any one of the foregoing method embodiments is implemented.

This application further provides a computer program product. When the computer program product is executed by a computer, a function in any one of the foregoing method embodiments is implemented.

All or some of the foregoing embodiments may be implemented through software, hardware, firmware, or any combination thereof. When software is used to implement the embodiments, the embodiments may be implemented all or partially in a form of a computer program product. The computer program product includes one or more computer instructions. When the computer instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that an "embodiment" mentioned in the entire specification means that particular characteristics, structures, or features related to the embodiment are included in at least one embodiment of this application. Therefore, the embodiments in the entire specification do not necessarily refer to a same embodiment. In addition, these particular characteristics, structures, or features may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be further understood that, in this application, both "when" and "if" mean that the UE or the base station performs corresponding processing in an objective situation, are not intended to limit time, do not require the UE or the base station to perform a determining action during implementation, and do not mean that there is another limitation either.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists.

The term "at least one of", or "at least one type of" in this specification indicates all of or any combination of the listed items, for example, "at least one of A, B, and C" may indicate the following six cases: Only A exists, only B exists, only C exists, both A and B exist, both B and C exist, and A, B and C all exist.

It should be understood that in the embodiments of this application, "B corresponding to A" indicates that B is associated with A, and B may be determined based on A. However, it should be further understood that determining B based on A does not mean that B is determined based on A only; that is, B may also be determined based on A and/or other information.

A person of ordinary skill in the art may be aware that, the units and steps in the examples described with reference to the embodiments disclosed in this specification may be implemented by electronic hardware, computer software, or a combination thereof. To clearly describe the interchangeability between the hardware and the software, the foregoing has generally described compositions and steps of each example according to functions. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in a computer-readable medium. The computer-readable medium includes a computer storage medium and a communications medium, and the communications medium includes any medium that enables a computer program to be transmitted from one place to another. The storage medium may be any available medium accessible by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of an instruction or a data structure and can be accessed by a computer. In addition, any connection may be appropriately defined as a computer-readable medium. For example, if the software is transmitted from a website, a server, or another remote source through a coaxial cable, an optical fiber/cable, a twisted pair, a DSL, or wireless technologies such as infrared ray, radio, and microwave, the coaxial cable, optical fiber/cable, twisted pair, DSL, or the wireless technologies such as infrared ray, radio, and microwave are included in fixation of a medium to which they belong. A disk and a disc used in this application include a compact disc (CD), a laser disc, an optical disc, a digital versatile disc (DVD), a floppy disk, and a Blu-ray disc. The disk usually copies data in a magnetic manner, but the disc copies data optically through a laser. The foregoing combination should also be included in the protection scope of the computer-readable medium.

In conclusion, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A link recovery method, comprising:
   determining a link failure of a first control resource set (CORESET) with index 0, wherein the first CORESET with index 0 is associated with a first synchronization signal block (SSB);
   determining a second SSB from a reference signal resource set, wherein a signal quality of the second SSB is greater than or equal to a threshold;
   sending a link failure recovery request, wherein the link failure recovery request comprises information indicating the second SSB, wherein the link failure recovery request is used to request to recover a communication link of a CORESET with index 0 based on the second SSB,
   identifying a second CORESET with index 0 associated with the second SSB indicated by the link failure recovery request; and
   identifying, on the second CORESET with index 0, downlink control information (DCI) in a common search space (CSS) set associated with a CORESET with index 0.

2. The method according to claim 1, wherein identifying the DCI comprises:
   identifying the DCI using quasi co-location (QCL) information associated with the second SSB.

3. The method according to claim 1, wherein sending the link failure recovery request comprises:
   sending the link failure recovery request on a physical random access channel (PRACH), wherein the PRACH is associated with the second SSB.

4. The method according to claim 1, wherein a cyclic redundancy check (CRC) of the DCI is scrambled by cell radio network temporary identifier (C-RNTI).

5. A link recovery method, comprising:
   receiving a link failure recovery request, wherein the link failure recovery request comprises information indicating a second SSB, wherein the link failure recovery request is used to request to recover a communication link of a control resource set (CORESET) with index 0 based on the second SSB;
   determining a second CORESET with index 0 based on the link failure recovery request, wherein the second CORESET with index 0 is associated with the second SSB indicated by the link failure recovery request; and
   sending, on the second CORESET with index 0, downlink control information (DCI) in a common search space (CSS) set associated with a CORESET with index 0.

6. The method according to claim 5, wherein sending the DCI comprises:
   sending the DCI using quasi co-location (QCL) information associated with the second SSB.

7. The method according to claim 5, wherein receiving the link failure recovery request comprises:
   receiving the link failure recovery request on a physical random access channel (PRACH), wherein the PRACH is associated with the second SSB.

8. The method according to claim 5, wherein a cyclic redundancy check (CRC) of the DCI is scrambled by cell radio network temporary identifier (C-RNTI).

9. A link recovery apparatus, comprising:
   a non-transitory memory storage comprising instructions; and
   one or more processors in communication with the memory storage, wherein the instructions, when executed by the one or more processors, cause the apparatus to:
   determine a link failure of a first control resource set (CORESET) with index 0, wherein the first CORESET with index 0 is associated with a first synchronization signal block (SSB);
   determine a second SSB from a reference signal resource set, wherein a signal quality of the second SSB is greater than or equal to a threshold;
   send a link failure recovery request, wherein the link failure recovery request comprises information indicating the second SSB, wherein the link failure recovery request is used to request to recover a communication link of a CORESET with index 0 based on the second SSB;
   identify a second CORESET with index 0 associated with the second SSB indicated by the link failure recovery request; and
   identify, on the second CORESET with index 0, downlink control information (DCI) in a common search space (CSS) set associated with a CORESET with index 0.

10. The apparatus according to claim 9, wherein the instructions, when executed by the one or more processors, further cause the apparatus to:
    identify the DCI using quasi co-location (QCL) information associated with the second SSB.

11. The apparatus according to claim 9, wherein the instructions, when executed by the one or more processors, cause the apparatus to:
    send the link failure recovery request on a physical random access channel (PRACH), wherein the PRACH is associated with the second SSB.

12. The apparatus according to claim 9, wherein a cyclic redundancy check (CRC) of the DCI is scrambled by cell radio network temporary identifier (C-RNTI).

13. A link recovery apparatus, comprising:
    a non-transitory memory storage comprising instructions; and
    one or more processors in communication with the memory storage, wherein the instructions, when executed by the one or more processors, cause the apparatus to:
    receive a link failure recovery request, wherein the link failure recovery request comprises information indicating a second SSB, and wherein the link failure recovery request is used to request to recover a communication link of a control resource set (CORESET) with index 0 based on the second SSB;
    determine a second CORESET with index 0 based on the link failure recovery request, wherein the second CORESET with index 0 is associated with the second SSB indicated by the link failure recovery request; and
    send, on the second CORESET with index 0, downlink control information (DCI) in a common search space (CSS) set associated with a CORESET with index 0.

14. The apparatus according to claim 13, wherein the instructions, when executed by the one or more processors, cause the apparatus to:
    send the DCI using quasi co-location (QCL) information associated with the second SSB.

15. The apparatus according to claim 13, wherein the instructions, when executed by the one or more processors, cause the apparatus to:
    receive the link failure recovery request on a physical random access channel (PRACH), wherein the PRACH is associated with the second SSB.

16. The apparatus according to claim 13, wherein a cyclic redundancy check (CRC) of the DCI is scrambled by cell radio network temporary identifier (C-RNTI).

\* \* \* \* \*